United States Patent
Hirose et al.

(10) Patent No.: US 12,490,024 B2
(45) Date of Patent: Dec. 2, 2025

(54) ECHO SUPPRESSING DEVICE, ECHO SUPPRESSING METHOD, AND NON-TRANSITORY COMPUTER READABLE RECORDING MEDIUM STORING ECHO SUPPRESSING PROGRAM

(71) Applicant: Panasonic Intellectual Property Corporation of America, Torrance, CA (US)

(72) Inventors: Yoshifumi Hirose, Kyoto (JP); Shinichi Yuzuriha, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 216 days.

(21) Appl. No.: 18/368,344

(22) Filed: Sep. 14, 2023

(65) Prior Publication Data
US 2024/0007789 A1    Jan. 4, 2024

Related U.S. Application Data

(63) Continuation of application No. PCT/JP2021/041796, filed on Nov. 12, 2021.

(30) Foreign Application Priority Data

Mar. 16, 2021   (JP) .................................. 2021-042592

(51) Int. Cl.
   *H04R 3/02*   (2006.01)
(52) U.S. Cl.
   CPC ..................................... *H04R 3/02* (2013.01)

(58) Field of Classification Search
   CPC .......... H04R 3/02; H04M 9/082; G10L 19/03; G10L 21/02; G10L 21/02082
   See application file for complete search history.

(56) References Cited

U.S. PATENT DOCUMENTS

2014/0079232 A1*  3/2014  Houshuyama ........ H04M 9/082
                                                          381/66

FOREIGN PATENT DOCUMENTS

JP    2010-103875 A    5/2010
JP    2017-191992 A    10/2017

OTHER PUBLICATIONS

International Search Report issued in WIPO Patent Application No. PCT/JP2021/041796, dated Feb. 8, 2022, along with an English translation thereof.

* cited by examiner

*Primary Examiner* — Mark Fischer
(74) *Attorney, Agent, or Firm* — Greenblum & Bernstein, P.L.C.

(57) ABSTRACT

An echo suppressing device includes: an echo canceller that suppresses a linear echo signal from an input signal acquired by a microphone; a spectrum envelope extraction unit that extracts spectrum envelope information from a reception signal to be output to a loudspeaker; a nonlinear echo estimation unit that estimates spectrum envelope information of a nonlinear echo signal included in the input signal from the spectrum envelope information extracted from the reception signal; and a nonlinear echo suppression unit that suppresses the nonlinear echo signal from an output signal of the echo canceller by using the estimated spectrum envelope information of the nonlinear echo signal.

14 Claims, 17 Drawing Sheets

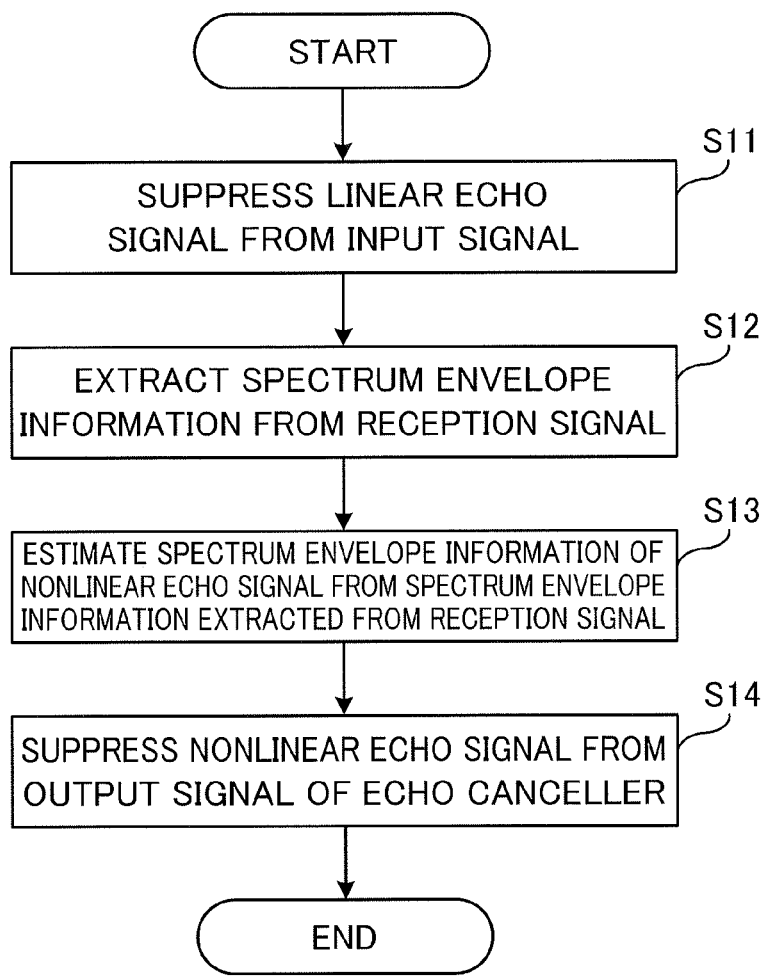

ECHO SUPPRESSING DEVICE, ECHO SUPPRESSING METHOD, AND NON-TRANSITORY COMPUTER READABLE RECORDING MEDIUM STORING ECHO SUPPRESSING PROGRAM

TECHNICAL FIELD

The present disclosure relates to a technique for suppressing a linear echo signal and a nonlinear echo signal included in an input signal acquired by a microphone.

BACKGROUND ART

In a hands-free call system, a video conference system, or the like, in a case where loudspeaker call using a loudspeaker and a microphone is performed, a voice spoken by a talker on a call transmission side is input to a microphone on the call transmission side, and is transmitted as a transmission signal to an apparatus on a call reception side via a network line. The voice loud-spoken from a loudspeaker on the call reception side is collected by a microphone on the call reception side and transmitted to an apparatus on the call transmission side via the network line. At this time, from a loudspeaker on the call transmission side, a voice spoken by the talker itself after a lapse of time of passing through the network line and time of propagation through a space on the call reception side is reproduced. In this manner, a voice propagating from the loudspeaker on the call reception side to the microphone is called an echo and becomes a factor that hinders a call. Therefore, echo suppression techniques such as an echo canceller and an echo suppressor have been proposed.

For example, an echo suppressing device disclosed in Patent Literature 1 recites that in a case where in reproducing a reception signal in a loudspeaker, when distortion may be caused in reproduction sound due to highness of a level of the reception signal, a gain having a larger suppression amount is calculated for each frequency than a gain that would be used when no distortion were generated, and a value based on a sound collection signal in a frequency domain is multiplied by the gain.

Further, for example, in the echo suppressing device disclosed in Patent Literature 2, in a case where power of a reproduction signal having any frequency value is larger than a predetermined threshold, when the power is a frequency value being (in) times of the frequency value (m=2, 3, . . . , M) or around the m-time frequency value, a value obtained by making a gain coefficient corresponding to the m-time frequency value and the frequency value around the m-time frequency value be closer to 0 is calculated as a second gain coefficient, and otherwise, the gain coefficient is calculated as the second gain coefficient.

However, in the above-described conventional techniques, it is difficult to stably suppress a nonlinear echo signal included in an input signal acquired by a microphone, and further improvement has been required.

CITATION LIST

Patent Literature

Patent Literature 1: JP 2017-191992 A
Patent Literature 2: JP 2010-103875 A

SUMMARY OF INVENTION

The present disclosure has been made to solve the above problem, and an object thereof is to provide a technique enabling stable suppression of a nonlinear echo signal included in an input signal acquired by a microphone.

An echo suppressing device according to the present disclosure includes: a first linear echo suppression unit that estimates an amplitude component and a phase component of a linear echo signal included in an input signal acquired by a microphone to suppress the linear echo signal from the input signal; a spectrum envelope extraction unit that extracts spectrum envelope information from at least one of a reception signal to be output to a loudspeaker, the input signal, and an output signal of the first linear echo suppression unit; a nonlinear echo estimation unit that estimates spectrum envelope information of a nonlinear echo signal included in the input signal from at least one of spectrum envelope information extracted from the reception signal, spectrum envelope information extracted from the input signal, and spectrum envelope information extracted from the output signal of the first linear echo suppression unit; and a nonlinear echo suppression unit that suppresses the nonlinear echo signal from the output signal of the first linear echo suppression unit by using the spectrum envelope information of the nonlinear echo signal estimated by the nonlinear echo estimation unit.

The present disclosure enables stable suppression of a nonlinear echo signal included in an input signal acquired by a microphone.

BRIEF DESCRIPTION OF DRAWINGS

FIG. 17 is a flowchart for describing operation of an echo suppressing device in the eighth embodiment of the present disclosure.

Figure 1:
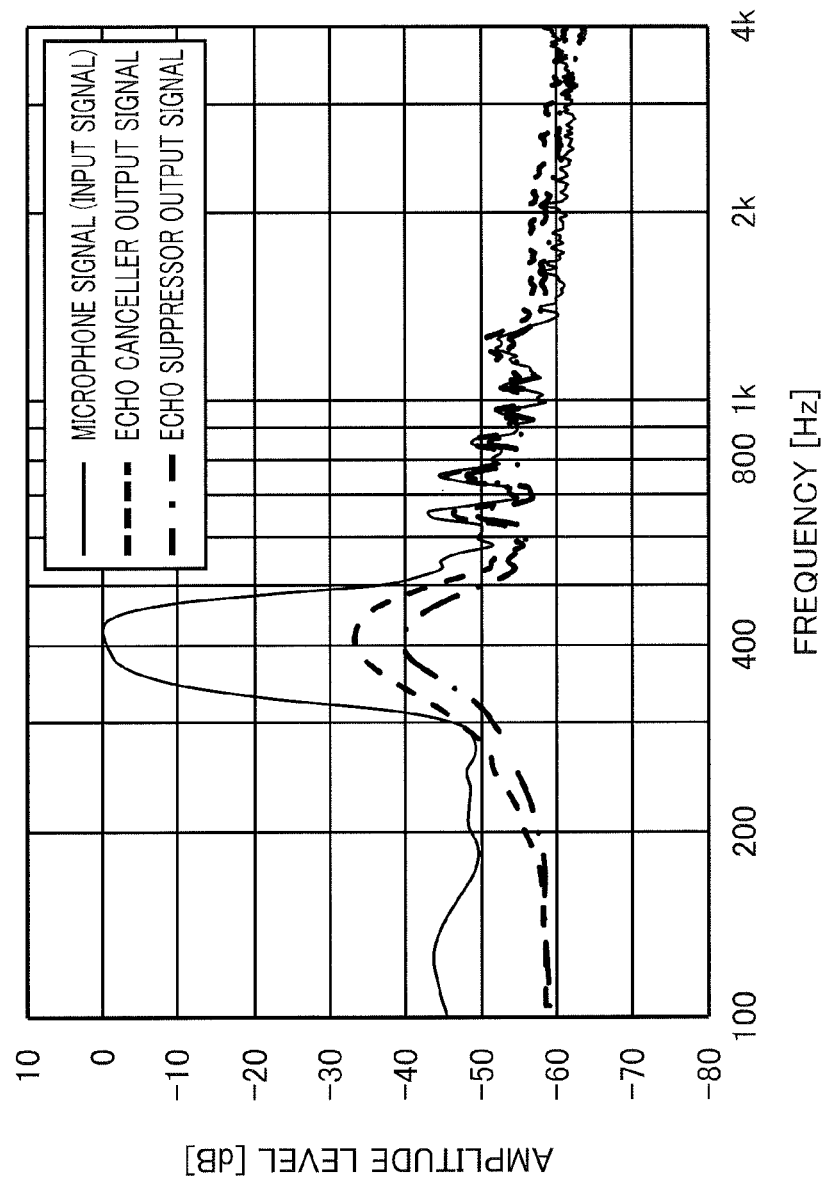
FIG. 1 is a diagram illustrating a microphone signal, an echo canceller output signal, and an echo suppressor output signal in a case where a nonlinear echo due to loudspeaker distortion is not included in an input signal.

DESCRIPTION OF EMBODIMENTS (Knowledge Underlying Present Disclosure)

An echo canceller is a technique of estimating an echo signal by an adaptive filter and removing an echo by subtracting the estimated echo signal from a voice signal collected by a microphone. The echo is superposition of a direct sound and a reflected sound of a sound loud-spoken from a loudspeaker. Therefore, a transfer characteristic between the loudspeaker and the microphone can be expressed by a finite impulse response (FIR) filter. An FIR type adaptive filter performs learning so as to approximate a transfer characteristic, and convolutes a filter coefficient into a reception signal to generate a pseudo echo signal that is an estimate value of an echo. As a learning algorithm of the adaptive filter, a least mean square (LMS) method, a normalized LMS (NLMS) method, a method based on independent component analysis (ICA), and the like have been proposed.

On the other hand, an echo suppressor is a technique of estimating a power spectrum of an echo in a frequency domain and subtracting the estimated power spectrum of the echo from a power spectrum of a voice signal collected by a microphone to suppress the echo. The echo suppressor suppresses an echo by, for example, a spectrum subtraction method or a Wiener filter method. Since the echo canceller described above takes time to learn an adaptive filter, there is a risk of generating a residual echo immediately after power-on and when an echo path fluctuates. In addition, noise or a transmission signal generated in a loudspeaker or a microphone might cause erroneous learning of the adaptive filter to cause an estimation error in a pseudo echo signal, resulting in increasing a residual echo. Therefore, it is a common practice to use an echo suppressor for the purpose of compensating for echo suppression at a subsequent stage of an echo canceller.

Because of estimation of an echo by a linear model, a conventional echo canceller and a conventional echo suppressor have a problem of difficulty in suppressing a nonlinear echo to which nonlinear noise such as loudspeaker distortion is imparted. In an apparatus for use in a notebook computer or a portable video conference system, since a large volume sound is loud-spoken from a small-diameter loudspeaker, an influence of a nonlinear echo caused by loudspeaker distortion remarkably appears, so that a call might not be comfortably made.

In addition, in Patent Literature 1 described above, it is difficult to suppress a nonlinear echo signal of a frequency component not included in a reception signal, such as harmonic distortion.

In addition, in Patent Literature 2 described above, it is difficult to suppress a broadband distortion component, and it is difficult to suppress a distortion component generated at a frequency value other than a frequency value of an integral multiple.

In order to solve the above problem, an echo suppressing device according to one aspect of the present disclosure includes: a first linear echo suppression unit that estimates an amplitude component and a phase component of a linear echo signal included in an input signal acquired by a microphone to suppress the linear echo signal from the input signal; a spectrum envelope extraction unit that extracts spectrum envelope information from at least one of a reception signal to be output to a loudspeaker, the input signal, and an output signal of the first linear echo suppression unit; a nonlinear echo estimation unit that estimates spectrum envelope information of a nonlinear echo signal included in the input signal from at least one of spectrum envelope information extracted from the reception signal, spectrum envelope information extracted from the input signal, and spectrum envelope information extracted from the output signal of the first linear echo suppression unit; and a nonlinear echo suppression unit that suppresses the nonlinear echo signal from the output signal of the first linear echo suppression unit by using the spectrum envelope information of the nonlinear echo signal estimated by the nonlinear echo estimation unit.

According to this configuration, the spectrum envelope information of the nonlinear echo signal included in the input signal is estimated from at least one of the spectrum envelope information extracted from the reception signal to be output to the loudspeaker, the spectrum envelope information extracted from the input signal, and the spectrum envelope information extracted from the output signal of the first linear echo suppression unit, and the nonlinear echo signal is suppressed from the output signal of the first linear echo suppression unit by using the estimated spectrum envelope information of the nonlinear echo signal. Accordingly, the nonlinear echo signal included in the input signal acquired by the microphone can be stably suppressed.

In addition, since the number of dimensions of the extracted spectrum envelope information can be reduced to be smaller than the number of dimensions of the signal before being extracted, it is possible to reduce a memory usage when estimating spectrum envelope information of the nonlinear echo signal. Furthermore, since the memory usage can be reduced, spectrum envelope information of the nonlinear echo signal can be estimated using the plurality of pieces of spectrum envelope information extracted from the plurality of signals in addition to the reception signal, so that estimation accuracy of the spectrum envelope information of the nonlinear echo signal can be improved.

In addition, the above-described echo suppressing device may further include a second linear echo suppression unit that estimates an amplitude component of a residual linear echo signal that has not been suppressed by the first linear echo suppression unit to suppress the residual linear echo signal from the output signal of the nonlinear echo suppression unit.

According to this configuration, the second linear echo suppression unit enables suppression of the residual linear echo signal from the output signal in which the nonlinear echo signal is suppressed. It is accordingly possible to allow the second linear echo suppression unit to stably operate, and improve linear echo signal suppression performance.

In addition, in the above-described echo suppressing device, using a nonlinear echo model indicating a relationship between at least one of the spectrum envelope information extracted from the reception signal, the spectrum envelope information extracted from the input signal, and the spectrum envelope information extracted from the output signal of the first linear echo suppression unit, and the spectrum envelope information of the nonlinear echo signal, the nonlinear echo estimation unit may estimate spectrum envelope information of the nonlinear echo signal included in the input signal from at least one of the spectrum envelope information extracted from the reception signal, the spectrum envelope information extracted from the input signal, and the spectrum envelope information extracted from the output signal of the first linear echo suppression unit.

Using the nonlinear echo model indicating the relationship between the spectrum envelope information of the nonlinear echo signal and at least one of the spectrum envelope information extracted from the reception signal to be output to the loudspeaker, the spectrum envelope information extracted from the input signal, and the spectrum envelope information extracted from the output signal of the first linear echo suppression unit, the spectrum envelope information of the nonlinear echo signal included in the input signal is estimated from at least one of the spectrum envelope information extracted from the reception signal, the spectrum envelope information extracted from the input signal, and the spectrum envelope information extracted from the output signal of the first linear echo suppression unit, and the nonlinear echo signal is suppressed from the output signal of the first linear echo suppression unit by using the estimated spectrum envelope information of the nonlinear echo signal. Accordingly, the nonlinear echo signal included in the input signal acquired by the microphone can be stably suppressed.

In addition, in the above-described echo suppressing device, the nonlinear echo model may be learned by using, as teacher data, at least one of the spectrum envelope information extracted from the reception signal, the spectrum envelope information extracted from the input signal, and the spectrum envelope information extracted from the output signal of the first linear echo suppression unit, and the spectrum envelope information extracted from the output signal of the first linear echo suppression unit that suppresses the linear echo signal from the input signal, using, as an input, at least one of the spectrum envelope information extracted from the reception signal, the spectrum envelope information extracted from the input signal, and the spectrum envelope information extracted from the output signal of the first linear echo suppression unit, and using the spectrum envelope information of the nonlinear echo signal as an output.

According to this configuration, since the first linear echo suppression unit suppresses only a linear echo signal and does not suppress a nonlinear echo signal, a signal in which the linear echo signal is suppressed by the first linear echo suppression unit can be used as a nonlinear echo signal for the teacher data.

In addition, the spectrum envelope information of the nonlinear echo signal is learned by using, as the teacher data, at least one of the spectrum envelope information extracted from the reception signal, the spectrum envelope information extracted from the input signal, and the spectrum envelope information extracted from the output signal of the first linear echo suppression unit, and the spectrum envelope information extracted from the output signal of the first linear echo suppression unit. Accordingly, complex distortion due to the loudspeaker can be accurately modeled, and the estimation accuracy of the nonlinear echo signal can be improved.

In addition, in the above-described echo suppressing device, using the nonlinear echo model indicating a relationship between the spectrum envelope information extracted from the reception signal and the spectrum envelope information of the nonlinear echo signal, the nonlinear echo estimation unit may estimate spectrum envelope information of the nonlinear echo signal included in the input signal from the spectrum envelope information extracted from the reception signal.

According to this configuration, using the nonlinear echo model indicating the relationship between the spectrum envelope information extracted from the reception signal and the spectrum envelope information of the nonlinear echo signal, the spectrum envelope information of the nonlinear echo signal can be estimated from the spectrum envelope information extracted from the reception signal. Accordingly, the spectrum envelope information of the nonlinear echo signal can be easily estimated from the spectrum envelope information extracted from the reception signal.

In addition, in the above-described echo suppressing device, using the nonlinear echo model indicating a relationship between the spectrum envelope information extracted from the reception signal and the spectrum envelope information extracted from the input signal, and the spectrum envelope information of the nonlinear echo signal, the nonlinear echo estimation unit may estimate spectrum envelope information of the nonlinear echo signal included in the input signal from the spectrum envelope information extracted from the reception signal and the spectrum envelope information extracted from the input signal.

According to this configuration, since the spectrum envelope information of the nonlinear echo signal is estimated from not only the spectrum envelope information extracted from the reception signal but also the spectrum envelope information extracted from the reception signal and the spectrum envelope information extracted from the input signal, the estimation accuracy of the spectrum envelope information of the nonlinear echo signal can be improved.

In addition, in the above-described echo suppressing device, using the nonlinear echo model indicating a relationship between the spectrum envelope information extracted from the reception signal and the spectrum envelope information extracted from the output signal of the first linear echo suppression unit, and the spectrum envelope information of the nonlinear echo signal, the nonlinear echo estimation unit may estimate spectrum envelope information of the nonlinear echo signal included in the input signal from the spectrum envelope information extracted from the reception signal and the spectrum envelope information extracted from the output signal of the first linear echo suppression unit.

According to this configuration, since the spectrum envelope information of the nonlinear echo signal is estimated from not only the spectrum envelope information extracted from the reception signal but also the spectrum envelope information extracted from the reception signal and the spectrum envelope information extracted from the output signal of the first linear echo suppression unit, the estimation accuracy of the spectrum envelope information of the nonlinear echo signal can be improved.

In addition, in the above-described echo suppressing device, using the nonlinear echo model indicating a relationship between the spectrum envelope information extracted from the reception signal, the spectrum envelope information extracted from the input signal and the spectrum envelope information extracted from the output signal of the first linear echo suppression unit, and the spectrum envelope information of the nonlinear echo signal, the nonlinear echo estimation unit may estimate spectrum envelope information of the nonlinear echo signal included in the input signal from the spectrum envelope information extracted from the reception signal, the spectrum envelope information extracted from the input signal, and the spectrum envelope information extracted from the output signal of the first linear echo suppression unit.

According to this configuration, since the spectrum envelope information of the nonlinear echo signal is estimated from not only the spectrum envelope information extracted from the reception signal but also the spectrum envelope information extracted from the reception signal, the spectrum envelope information extracted from the input signal, and the spectrum envelope information extracted from the output signal of the first linear echo suppression unit, the estimation accuracy of the spectrum envelope information of the nonlinear echo signal can be improved.

In addition, in the above-described echo suppressing device, the first linear echo suppression unit may include an adaptive filter that generates a pseudo linear echo signal indicating a component of the reception signal included in the input signal by convoluting a filter coefficient and the reception signal, and a subtractor that subtracts the pseudo linear echo signal from the input signal, and using the nonlinear echo model indicating a relationship between the spectrum envelope information extracted from the reception signal and spectrum envelope information extracted from the pseudo linear echo signal from the adaptive filter, and the spectrum envelope information of the nonlinear echo signal, the nonlinear echo estimation unit may estimate spectrum envelope information of the nonlinear echo signal included in the input signal from the spectrum envelope information extracted from the reception signal and the spectrum envelope information extracted from the pseudo linear echo signal from the adaptive filter.

According to this configuration, since the spectrum envelope information of the nonlinear echo signal is estimated from not only the spectrum envelope information extracted from the reception signal but also the spectrum envelope information extracted from the reception signal and the spectrum envelope information extracted from the pseudo linear echo signal from the adaptive filter of the first linear echo suppression unit, the estimation accuracy of the spectrum envelope information of the nonlinear echo signal can be improved.

In addition, in the above-described echo suppressing device, using the nonlinear echo model indicating a relationship between the spectrum envelope information extracted from the input signal and the spectrum envelope information of the nonlinear echo signal, the nonlinear echo estimation unit may estimate spectrum envelope information of the nonlinear echo signal included in the input signal from the spectrum envelope information extracted from the input signal.

According to this configuration, since the spectrum envelope information of the nonlinear echo signal is estimated from the spectrum envelope information extracted from the input signal by using the nonlinear echo model indicating the relationship between the spectrum envelope information extracted from the input signal and the spectrum envelope information of the nonlinear echo signal, the spectrum envelope information of the nonlinear echo signal can be easily estimated from the spectrum envelope information extracted from the input signal.

In addition, in the above-described echo suppressing device, the spectrum envelope extraction unit may extract spectrum envelope information from at least one of the reception signal, the input signal, and the output signal of the first linear echo suppression unit by a linear predictive coding analysis method.

According to this configuration, since the spectrum envelope information is extracted from at least one of the reception signal, the input signal, and the output signal of the first linear echo suppression unit by the linear predictive coding analysis method, it is possible to compress an amount of information of at least one of the reception signal, the input signal, and the output signal of the first linear echo suppression unit. In addition, since the spectrum envelope information having a peak of an original signal emphasized is extracted by the linear predictive coding analysis method, it is possible to accurately express a spectrum of the original signal even with a small number of dimensions.

In addition, in the above-described echo suppressing device, the spectrum envelope extraction unit may convert at least one linear predictive coding coefficient of the reception signal, the input signal, and the output signal of the first linear echo suppression unit analyzed by a linear predictive coding analysis method into a partial auto-correlation (PARCOR) coefficient, and extract spectrum envelope information represented by the converted PARCOR coefficient.

Since according to this configuration, a value range of the PARCOR coefficient is −1 to +1, an advantage of eliminating a need of normalizing learning data of a neural network is presented. In addition, since the PARCOR coefficient has no difference in coefficient sensitivity depending on the number of dimensions, it is possible to be less likely to be influenced by a prediction error of the neural network as compared with a linear predictive coding coefficient. In addition, since a dynamic range of the PARCOR coefficient is fixed, the dynamic range can be easily expressed in a fixed decimal point form at the time of implementation.

In addition, the present disclosure can be implemented not only as an echo suppressing device having such a characteristic configuration as described above, but also as an echo suppressing method or the like of executing characteristic processing corresponding to the characteristic configuration provided in the echo suppressing device. The present disclosure can be implemented also as a computer program that causes a computer to execute the characteristic processing included in such echo suppressing method. Accordingly, even according to other aspect below, the same effect as that obtained by the above-described echo suppressing device can be achieved.

An echo suppressing method according to another aspect of the present disclosure includes: estimating, by a first linear echo suppression unit, an amplitude component and a phase component of a linear echo signal included in an input signal acquired by a microphone to suppress the linear echo signal from the input signal; extracting, by a spectrum envelope extraction unit, spectrum envelope information from at least one of a reception signal to be output to a loudspeaker, the input signal, and an output signal of the first linear echo suppression unit; estimating, by a nonlinear echo estimation unit, spectrum envelope information of a nonlinear echo signal included in the input signal from at least one of spectrum envelope information extracted from the reception signal, spectrum envelope information extracted from the input signal, and spectrum envelope information extracted from the output signal of the first linear echo suppression unit; and suppressing, by a nonlinear echo suppression unit, the nonlinear echo signal from the output signal of the first linear echo suppression unit by using the spectrum envelope information of the nonlinear echo signal estimated by the nonlinear echo estimation unit.

A non-transitory computer readable recording medium storing an echo suppressing program according to yet another aspect of the present disclosure causes a computer to function as: a first linear echo suppression unit that estimates an amplitude component and a phase component of a linear echo signal included in an input signal acquired by a microphone to suppress the linear echo signal from the input signal; a spectrum envelope extraction unit that extracts spectrum envelope information from at least one of a reception signal to be output to a loudspeaker, the input signal, and an output signal of the first linear echo suppression unit; a nonlinear echo estimation unit that estimates spectrum envelope information of a nonlinear echo signal included in the input signal from at least one of spectrum envelope information extracted from the reception signal, spectrum envelope information extracted from the input signal, and spectrum envelope information extracted from the output signal of the first linear echo suppression unit; and a nonlinear echo suppression unit that suppresses the nonlinear echo signal from the output signal of the first linear echo suppression unit by using the spectrum envelope information of the nonlinear echo signal estimated by the nonlinear echo estimation unit.

Embodiments of the present disclosure will be described below with reference to the accompanying drawings. The following embodiments are examples embodying the present disclosure, and are not intended to limit a technical scope of the present disclosure.

First Embodiment

First, a generation factor of a nonlinear echo will be described.

Nonlinear distortion is a generic term for distortion that occurs when an input and an output of a system does not have a proportional relationship. For example, when a two-tone sine wave having frequencies f1 and f2 is input to a system having input/output characteristics in which an output amplitude is clipped as an input amplitude increases, in an amplitude spectrum of an output waveform, nonlinear distortion occurs in a frequency component that does not exist in an input signal. Nonlinear distortion can be roughly classified into harmonic distortion generated at a frequency of an integral multiple of an input signal such as at 2f1 and 2f2, and intermodulation distortion generated at frequencies of a sum and a difference of input signals such as at f1+f2 and f2−f1.

In an actual system, nonlinear distortion of a loud-spoken sound of a loudspeaker is a factor in a nonlinear echo. In a widely used electrodynamic loudspeaker, displacement of a diaphragm increases in a frequency band near a lowest resonance frequency f0. Then, nonlinear distortion occurs due to nonlinearity of a driving force generated when a voice coil moves beyond a range of a magnetic flux generated by a permanent magnet, or due to mechanical nonlinearity of a support system such as a cone edge or a damper. Furthermore, in a small-diameter loudspeaker, in order to compensate for a decrease in a sound pressure level in a low band, the sound pressure around the lowest resonance frequency f0 may be boosted by preprocessing. In this case, displacement of the diaphragm increases, which causes further nonlinear distortion to be generated.

Subsequently, an influence of a nonlinear echo on conventional echo suppression techniques will be described. As a conventional echo suppression technique, a system including an echo canceller and an echo suppressor will be described.

An echo canceller removes an echo by calculating an estimate value of an echo, i.e, a pseudo echo signal, by an adaptive filter and subtracting the calculated pseudo echo signal from a microphone signal. Specifically, when a reception signal is represented as x(k), a coefficient of the adaptive filter as w n (k), and the number of taps of the adaptive filter as N, a pseudo echo y(k) is expressed by the following Equation (1).

[Formula 1]

$$y(k) = \sum_{n=0}^{N-1} w_n(k) x(k-n) \quad (1)$$

The above Equation (1) represents that a pseudo echo is expressed by a linear sum in which a phase and an amplitude of the reception signal are changed, and a nonlinear echo cannot be expressed regardless of an adaptive algorithm for use in coefficient learning.

The echo suppressor is provided at a subsequent stage of the echo canceller. The echo suppressor suppresses a residual echo by estimating a power spectrum of a residual echo that has not been suppressed by the echo canceller. In a commonly widely used echo suppressor based on the Wiener filter method, an acoustic coupling amount $A_E(\omega)$ between a short-time spectrum $X(\omega)$ of a reception signal and a short-time spectrum $Y_{EC}(\omega)$ of a residual echo is estimated to calculate a Wiener filter $G_{wiener}(W)$ on the basis of the following Equation (2).

[Formula 2]

$$G_{wiener}(\omega) = \frac{|Y_{EC}(\omega)|^2 - |A_E(\omega) X(\omega)|^2}{|Y_{EC}(\omega)|^2} \quad (2)$$

Then, by multiplying the short-time spectrum $Y_{EC}(o)$ of the residual echo by the Wiener filter $G_{wiener}(\omega)$ as shown in the following Equation (3), the echo suppressor obtains a signal $Y_{ES}(\omega)$ with an echo suppressed.

$$Y_{ES}(\omega) = G_{wiener}(\omega) Y_{EC}(\omega) \quad (3)$$

In other words, the echo suppressor estimates the residual echo by the acoustic coupling amount $A_E(\omega)$ estimated for each frequency component and the reception signal $X(\omega)$. Therefore, the echo suppressor cannot estimate a frequency component that does not exist in a reception signal, such as a nonlinear echo.

In support of the above description, the inventor conducted an experiment to confirm influence assessment of nonlinear echoes. In the evaluation experiment, a conventional echo suppressing device was used. A conventional echo suppressing device includes a loudspeaker that amplifies a reception signal, a microphone, an echo canceller that suppresses an echo signal from an input signal acquired by the microphone, and an echo suppressor that suppresses an echo signal from an output signal from the echo canceller. In addition, in the evaluation experiment, ⅓ octave band noise having a center frequency of 400 Hz, which is near the lowest resonance frequency f0 of the loudspeaker used for sound amplification, was used.

Figure 2:
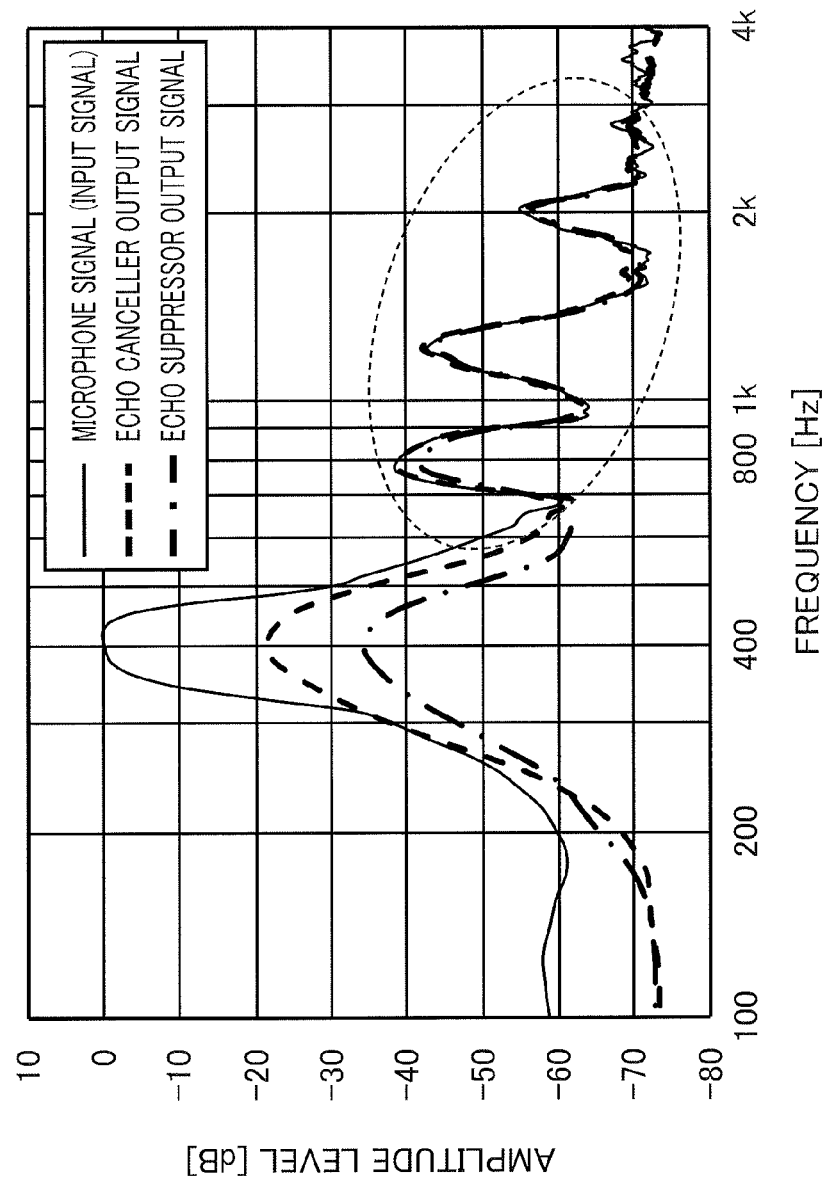
FIG. 2 is a diagram illustrating the microphone signal, the echo canceller output signal, and the echo suppressor output signal in a case where a nonlinear echo due to loudspeaker distortion is included in the input signal.

FIG. 1 is a diagram illustrating a microphone signal, an echo canceller output signal, and an echo suppressor output signal in a case where a nonlinear echo due to loudspeaker distortion is not included in an input signal, and FIG. 2 is a diagram illustrating the microphone signal, the echo canceller output signal, and the echo suppressor output signal in a case where a nonlinear echo due to loudspeaker distortion is included in the input signal.

In FIGS. 1 and 2, a solid line represents the microphone signal (input signal) output from a microphone, a broken line represents the echo canceller output signal, and a dashed line represents the echo suppressor output signal. In FIGS. 1 and 2, the horizontal axis represents frequency, and the vertical axis represents amplitude level.

In FIG. 2, second to fourth harmonics of the input signal appear, and as described above, it is shown that nonlinear echoes cannot be suppressed at all by conventional echo canceller and echo suppressor. Furthermore, in FIGS. 1 and 2, focusing on a fundamental tone around 400 Hz, the echo canceller suppresses an echo of about 35 dB when no nonlinear echo is included, whereas a suppression amount of the echo canceller is deteriorated to about 20 dB when a nonlinear echo is included. This is considered to be caused by an error occurring in echo estimation due to erroneous learning resulted from forcibly continuing update of a filter coefficient in order to simulate a nonlinear echo that an adaptive filter cannot originally express.

An essential problem of a conventional echo suppression technique is that a nonlinear echo cannot be expressed because an echo is estimated with a linear model. Therefore, the echo suppressing device according to a first embodiment estimates a nonlinear echo using a neural network capable of approximating an arbitrary nonlinear function. As a method of introducing the neural network, two methods are applicable: a method of estimating an amplitude and a phase of a nonlinear echo and applying the estimated amplitude and phase to the echo canceller; and a method of estimating only the amplitude of the nonlinear echo and applying the estimated amplitude to the echo suppressor. The former requires higher estimation accuracy than the latter, and has a problem of an increase in an operation amount. Therefore, the echo suppressing device according to the first embodiment realizes suppression of a nonlinear echo by an echo suppressor method that can be implemented with low power consumption, low cost, and a small operation amount.

Figure 3:
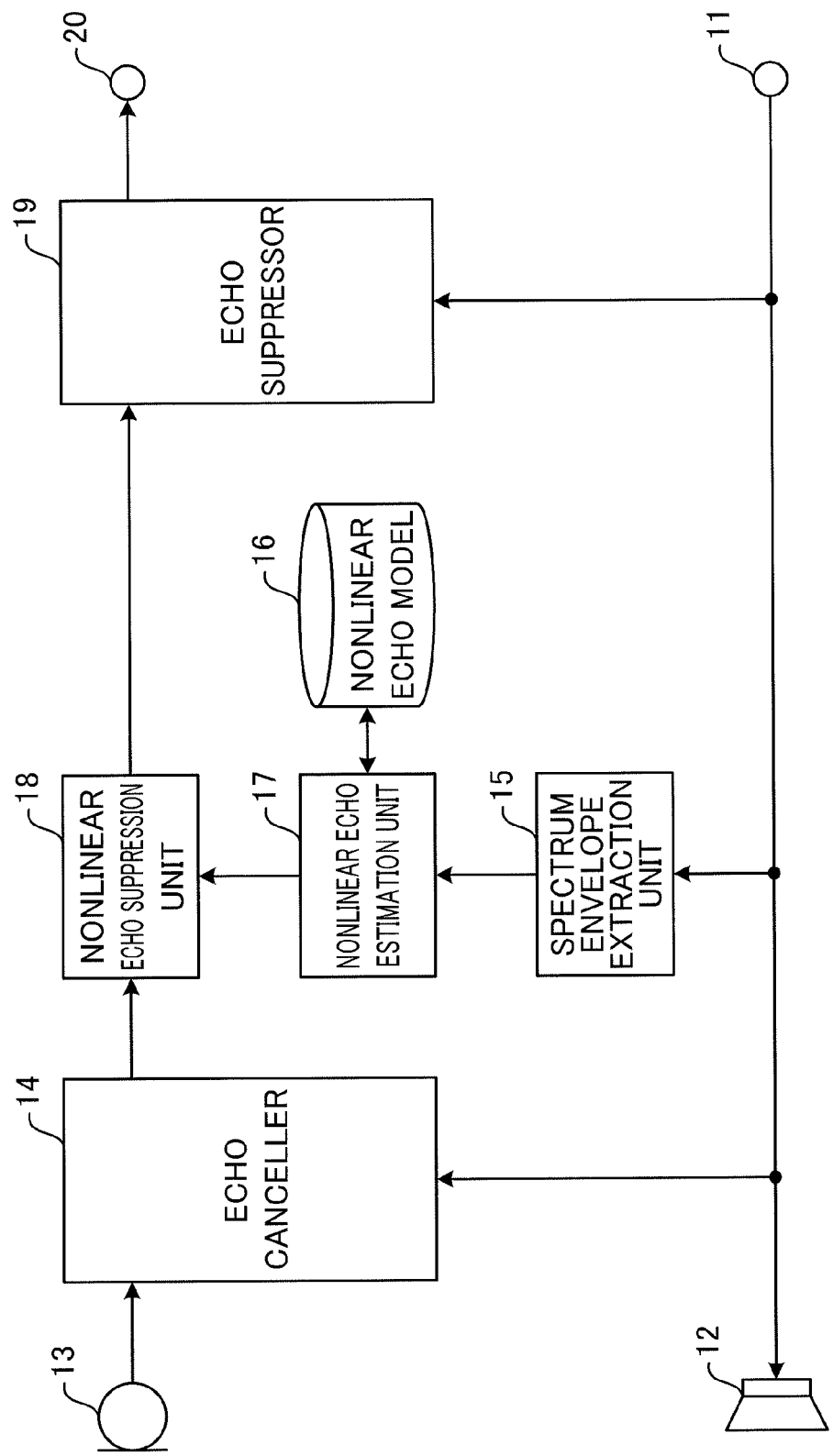
FIG. 3 is a diagram illustrating a configuration of a call device in a first embodiment of the present disclosure.

FIG. 3 is a diagram illustrating a configuration of a call device in the first embodiment of the present disclosure. Note that the call device is for use in an amplifying hands-free call system, an amplifying two-way communication conference system, an interphone system, and the like.

The call device illustrated in FIG. 3 includes an echo suppressing device 1, an input terminal 11, a loudspeaker 12, a microphone 13, and an output terminal 20.

The input terminal 11 outputs a reception signal received from a call device (not illustrated) on a call reception side to the echo suppressing device 1.

The loudspeaker 12 outputs the input reception signal to the outside. Here, in a case where voice output from the loudspeaker 12 is collected by the microphone 13, voice uttered by a talker on the call reception side is reproduced from a loudspeaker on the call reception side with a delay, and a so-called acoustic echo is generated. Therefore, the echo suppressing device 1 suppresses an acoustic echo signal included in an input signal output from the microphone 13. At this time, the acoustic echo signal includes a linear echo signal and a nonlinear echo signal.

The microphone 13 is arranged in a space where a call transmission party is present, and collects a voice of the call transmission party. The microphone 13 outputs the input signal indicating the collected voice to the echo suppressing device 1.

The output terminal 20 outputs the input signal in which the linear echo signal and the nonlinear echo signal are suppressed by the echo suppressing device 1.

Note that the input terminal 11 and the output terminal 20 are connected to a communication unit (not illustrated). The communication unit transmits the input signal to the call device (not illustrated) on the call reception side via a network, and receives the reception signal from the call device (not illustrated) on the call reception side via the network. The network is the Internet, for example.

The echo suppressing device 1 includes an echo canceller 14, a spectrum envelope extraction unit 15, a nonlinear echo model storage unit 16, a nonlinear echo estimation unit 17, a nonlinear echo suppression unit 18, and an echo suppressor 19.

The input terminal 11 outputs the reception signal to the loudspeaker 12, the echo canceller 14, the spectrum envelope extraction unit 15, and the echo suppressor 19.

The echo canceller 14 estimates an amplitude component and a phase component of a linear echo signal included in the input signal acquired by the microphone 13 to suppress the linear echo signal from the input signal. The echo canceller 14 is an example of a first linear echo suppression unit. The echo canceller 14 suppresses only the linear echo signal included in the input signal output from the microphone 13.

The echo canceller 14 includes an adaptive filter and a subtractor (not illustrated).

The adaptive filter convolutes a filter coefficient and the reception signal to generate a pseudo echo signal indicating a component of the reception signal included in the input signal acquired by the microphone 13.

The subtractor calculates an error signal between the input signal from the microphone 13 and the pseudo echo signal from the adaptive filter, and outputs the calculated error signal to the adaptive filter. The adaptive filter corrects the filter coefficient on the basis of the input error signal, and generates the pseudo echo signal by convoluting the corrected filter coefficient and the reception signal. The adaptive filter uses an adaptive algorithm to correct the filter coefficient such that the error signal is minimized. As the adaptive algorithm, for example, a learning identification method (normalized least mean square (NLMS) method), an affine projection method, or a recursive least square (RLS) method is used.

Furthermore, the subtractor suppresses a linear echo signal from the input signal by subtracting the pseudo echo signal from the adaptive filter from the input signal from the microphone 13. Then, the subtractor outputs the input signal in which the linear echo signal has been suppressed to the nonlinear echo suppression unit 18.

The spectrum envelope extraction unit 15 extracts spectrum envelope information from at least one of the reception signal to be output to the loudspeaker 12, the input signal acquired by the microphone 13, and the output signal of the echo canceller 14. The spectrum envelope extraction unit 15 according to the first embodiment extracts the spectrum envelope information from the reception signal to be output to the loudspeaker 12.

The spectrum envelope extraction unit 15 extracts the spectrum envelope information from at least one of the reception signal, the input signal, and the output signal of the echo canceller 14 by a linear predictive coding (LPC) analysis method. The spectrum envelope extraction unit 15 according to the first embodiment extracts the spectrum envelope information from the reception signal by the linear predictive coding analysis method. The spectrum envelope extraction unit 15 predicts a future value of a discrete signal as a linear mapping of values of a previous sample group by the linear predictive coding analysis.

As a method for calculating the spectrum envelope information, there is provided a linear predictive coding model (LPC model). The linear predictive coding model is for predicting a certain sample value s(n) of a voice waveform from previous n sample values, and is expressed by the following Equation (4).

[Formula 3]

$$y(n) \approx \alpha_1 y(n-1) + \alpha_2 y(n-2) + \alpha_3 y(n-3) + \ldots + \alpha_p y(n-p) \quad (4)$$

The spectrum envelope extraction unit 15 calculates a linear predictive coding coefficient of the reception signal by performing the linear predictive coding analysis on the reception signal, and calculates the spectrum envelope information of the reception signal using the calculated linear predictive coding coefficient. A p-th linear predictive coding coefficient α for the n sample values can be calculated by using an auto-correlation method, a covariance method, or the like. When the calculated linear predictive coding coefficient α is used, an input voice signal can be generated by the following Equation (5).

$$Y(z) = \{1/A(z)\} U(z) \quad (5)$$

In the above Equation (5), Y(z) represents z conversion of a voice signal y(n), 1/A(z) represents a transfer function, and U(z) represents z conversion of a sound source signal u(n) and corresponds to white noise.

Figure 4:
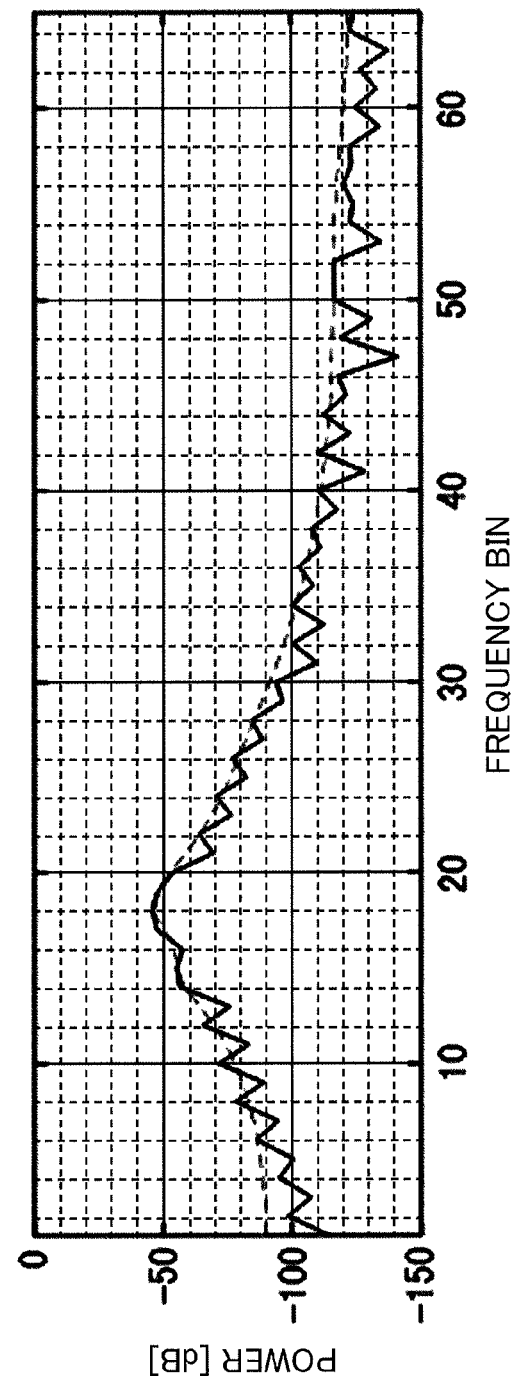
FIG. 4 is a diagram illustrating an example of a spectrum of a reception signal and spectrum envelope information of the reception signal in the first embodiment.

FIG. 4 is a diagram illustrating an example of a spectrum of the reception signal and spectrum envelope information of the reception signal in the first embodiment. In FIG. 4, the horizontal axis represents a frequency bin, and the vertical axis represents power. Also in FIG. 4, a solid line represents a spectrum of the reception signal, and a broken line represents the spectrum envelope information of the reception signal.

The number of dimensions of the spectrum envelope information illustrated in FIG. 4 is, for example, sixth to twentieth dimensions. The number of dimensions of the spectrum envelope information is smaller than the number of dimensions of the reception signal. Therefore, the spectrum envelope extraction unit 15 can compress an information amount of the reception signal by extracting the spectrum envelope information of the reception signal.

In addition, since the spectrum envelope information extracted from the reception signal by the linear predictive coding emphasizes a peak of the reception signal, it is possible to accurately express the spectrum of the reception signal even with a small number of dimensions. Furthermore, as the number of dimensions for the linear predictive coding increases, the spectrum envelope information can more finely express the spectrum of the reception signal.

The spectrum envelope extraction unit 15 outputs the spectrum envelope information extracted from the reception signal to the nonlinear echo estimation unit 17.

In the first embodiment, the spectrum envelope extraction unit 15 may convert at least one linear predictive coding coefficient of the reception signal analyzed by the linear predictive coding analysis method, the input signal, and the output signal of the echo canceller 14 into a partial auto-correlation (PARCOR) coefficient, and extract spectrum envelope information represented by the converted PARCOR coefficient. A PARCOR coefficient is known to have better interpolation characteristics than a linear predictive coding coefficient. In addition, the PARCOR coefficient can be calculated by using the Levinson-Durbin-Itakura algorithm. Since a value range of the PARCOR coefficient is −1 to +1, an advantage of eliminating a need of normalization of learning data of a neural network is presented. In addition, since the PARCOR coefficient has no difference in coefficient sensitivity depending on the number of dimensions, it is possible to be less likely to be influenced by a prediction error of the neural network as compared with a linear predictive coding coefficient. In addition, since a dynamic range of the PARCOR coefficient is fixed, the dynamic range can be easily expressed in a fixed decimal point form at the time of implementation.

Note that the spectrum envelope information may be expressed using line spectral pairs (LSP) in addition to the linear predictive coding coefficient and the PARCOR coefficient. The spectrum envelope extraction unit 15 may convert at least one linear predictive coding coefficient of the reception signal analyzed by the linear predictive coding analysis method, the input signal, and the output signal of the echo canceller 14 into a line spectral pair.

Although in the first embodiment, the spectrum envelope extraction unit 15 extracts the spectrum envelope information from at least one of the reception signal, the input signal, and the output signal of the echo canceller 14 by the linear predictive coding analysis method, the present disclosure is not limited thereto. The spectrum envelope extraction unit 15 may extract spectrum envelope information of at least one of the reception signal, the input signal and the output signal of the echo canceller 14 by, for example, a cepstrum analysis method.

The nonlinear echo model storage unit 16 stores in advance a nonlinear echo model indicating a relationship between at least one of spectrum envelope information extracted from the reception signal to be output to the loudspeaker 12, spectrum envelope information extracted from the input signal acquired by the microphone 13, and spectrum envelope information extracted from the output signal of the echo canceller 14, and spectrum envelope information of the nonlinear echo signal. Note that the nonlinear echo model storage unit 16 in the first embodiment stores in advance a nonlinear echo model indicating a relationship between spectrum envelope information extracted from the reception signal and the spectrum envelope information of the nonlinear echo signal. The nonlinear echo model is, for example, a neural network.

The nonlinear echo model is learned by using, as teacher data, at least one of the spectrum envelope information extracted from the reception signal, the spectrum envelope information extracted from the input signal, and the spectrum envelope information extracted from the output signal of the echo canceller 14, and the spectrum envelope information extracted from the output signal of the echo canceller that suppresses the linear echo signal from the input signal, using, as an input, at least one of the spectrum envelope information extracted from the reception signal, the spectrum envelope information extracted from the input signal, and the spectrum envelope information extracted from the output signal of the echo canceller 14, and using the spectrum envelope information of the nonlinear echo signal as an output. The nonlinear echo model in the first embodiment is learned by using, as the teacher data, the spectrum envelope information extracted from the reception signal and the spectrum envelope information extracted from the output signal of the echo canceller that suppresses the linear echo signal from the input signal, using, as an input, the spectrum envelope information extracted from the reception signal, and using the spectrum envelope information of the nonlinear echo signal as an output.

The nonlinear echo estimation unit 17 estimates spectrum envelope information of the nonlinear echo signal included in the input signal from at least one of the spectrum envelope information extracted from the reception signal to be output to the loudspeaker 12, the spectrum envelope information extracted from the input signal acquired by the microphone 13, and the spectrum envelope information extracted from the output signal of the echo canceller 14. More specifically, using the nonlinear echo model indicating the relationship between at least one of the spectrum envelope information extracted from the reception signal, the spectrum envelope information extracted from the input signal, and the spectrum envelope information extracted from the output signal of the echo canceller 14, and the spectrum envelope information of the nonlinear echo signal, the nonlinear echo estimation unit 17 estimates spectrum envelope information of the nonlinear echo signal included in the input signal from at least one of the spectrum envelope information extracted from the reception signal, the spectrum envelope information extracted from the input signal, and the spectrum envelope information extracted from the output signal of the echo canceller 14.

Figure 5:
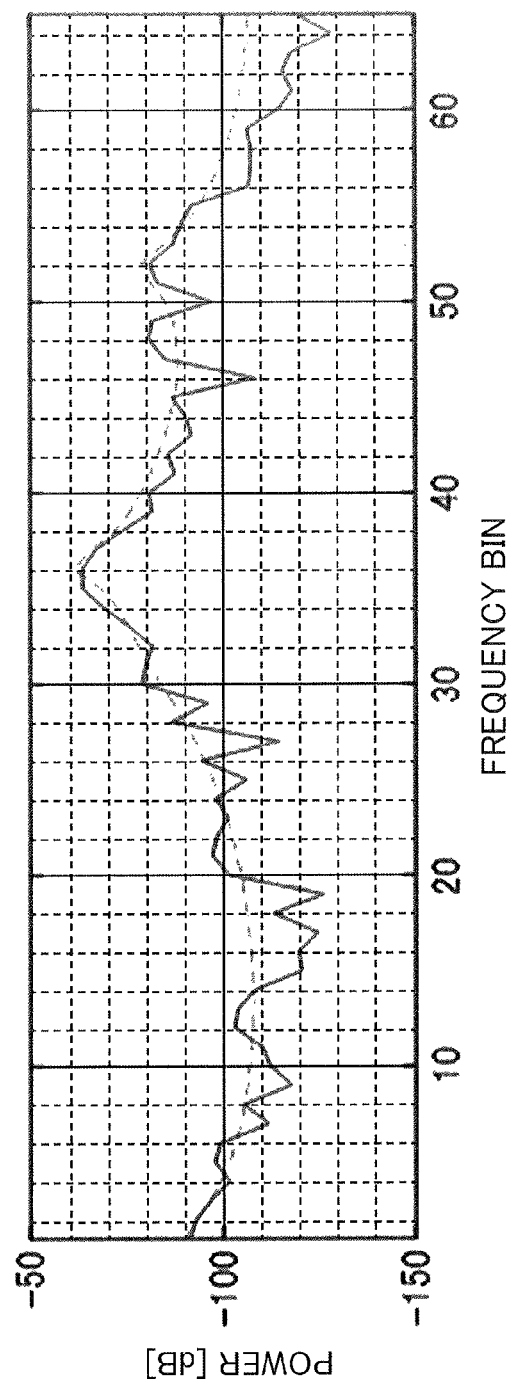
FIG. 5 is a diagram illustrating an example of a spectrum of a nonlinear echo signal and spectrum envelope information of the nonlinear echo signal in the first embodiment.

FIG. 5 is a diagram illustrating an example of a spectrum of a nonlinear echo signal and spectrum envelope information of the nonlinear echo signal in the first embodiment. In FIG. 5, the horizontal axis represents a frequency bin, and the vertical axis represents power. Also in FIG. 5, a solid line represents a spectrum of a nonlinear echo signal, and a broken line represents spectrum envelope information of the nonlinear echo signal.

The number of dimensions of the spectrum envelope information illustrated in FIG. 5 is, for example, sixth to twentieth dimensions. The number of dimensions of the spectrum envelope information is smaller than the number of dimensions of the nonlinear echo signal. Therefore, the nonlinear echo estimation unit 17 enables reduction in a memory usage by estimating spectrum envelope information of the nonlinear echo signal from the spectrum envelope information extracted from the reception signal.

As described above, in the first embodiment, by expressing the reception signal and the nonlinear echo signal by the spectrum envelope information, the numbers of dimensions of the input signal and the output signal handled by the nonlinear echo model are reduced. Meanwhile, by expressing a reception signal and a nonlinear echo signal in a time domain by a reception signal and a nonlinear echo signal in a frequency domain, it is also possible to reduce the number of dimensions of the input signal and the output signal handled by the nonlinear echo model. In this case, by performing fast Fourier transform on the reception signal, the reception signal in the time domain is converted into the reception signal in the frequency domain, the reception signal in the frequency domain is used as the input signal of the nonlinear echo model, and the nonlinear echo signal in the frequency domain is output from the nonlinear echo model.

However, while the number of dimensions of the signal subjected to fast Fourier transform is, for example, 64 dimensions, 128 dimensions, 256 dimensions, 512 dimensions, or 1024 dimensions, the number of dimensions of the spectrum envelope information is, for example, sixth to twentieth dimensions. Thus, the spectrum envelope information enables more drastic compression of an amount of information than the signal converted into the frequency domain, and enables more drastic reduction in the memory usage.

In addition, since the spectrum envelope information of the nonlinear echo signal estimated by the nonlinear echo estimation unit 17 emphasizes a peak of the nonlinear echo signal, it is possible to accurately express the spectrum of the nonlinear echo signal even with a small number of dimensions. Furthermore, an increase in the number of dimensions for the linear predictive coding enables the spectrum envelope information to more finely express the spectrum of the nonlinear echo signal.

The nonlinear echo estimation unit 17 reads the nonlinear echo model from the nonlinear echo model storage unit 16. The nonlinear echo estimation unit 17 inputs the spectrum envelope information of a reception signal output from the spectrum envelope extraction unit 15 to the nonlinear echo model to acquire the spectrum envelope information of the nonlinear echo signal from the nonlinear echo model. The nonlinear echo estimation unit 17 outputs the spectrum envelope information of the nonlinear echo signal estimated using the spectrum envelope information of the reception signal to the nonlinear echo suppression unit 18.

The nonlinear echo suppression unit 18 uses the spectrum envelope information of the nonlinear echo signal estimated by the nonlinear echo estimation unit 17 to suppress the nonlinear echo signal from the input signal. More specifically, the nonlinear echo suppression unit 18 uses the spectrum envelope information of the nonlinear echo signal estimated by the nonlinear echo estimation unit 17 to suppress the nonlinear echo signal from the output signal of the echo canceller 14.

The nonlinear echo suppression unit 18 calculates a Wiener filter $G_{NN}(k)$ from estimated spectrum envelope information $x_{NN}(k)$ of the nonlinear echo signal and an output signal (input signal) $y_{EC}(k)$ from the echo canceller 14 on the basis of the following Equation (6).

[Formula 4]

$$G_{NN}(k) = \frac{|y_{EC}(k)|^2 - |x_{NN}(k)|^2}{|y_{EC}(k)|^2} \quad (6)$$

The nonlinear echo suppression unit 18 obtains an input signal $y_{NL-ES}(k)$ in which a nonlinear echo signal has been suppressed by multiplying the input signal $y_{EC}(k)$ by the Wiener filter $G_{NN}(k)$ as in the following Equation (7).

$$y_{NL-ES}(k) = G_{NN}(k) y_{EC}(k) \quad (7)$$

The nonlinear echo suppression unit 18 outputs the input signal with only the nonlinear echo signal suppressed to the echo suppressor 19.

The echo suppressor 19 estimates an amplitude component of a residual linear echo signal that has not been suppressed by the echo canceller 14 to suppress a residual linear echo signal. More specifically, the echo suppressor 19 estimates the amplitude component of the residual linear echo signal that has not been suppressed by the echo canceller 14 to suppress the residual linear echo signal from an output signal of the nonlinear echo suppression unit 18. The echo suppressor 19 is an example of a second linear echo suppression unit.

The echo suppressor 19 suppresses the residual linear echo signal by a spectrum subtraction method or a Wiener filter method. The echo suppressor 19 estimates the acoustic coupling amount for each frequency using a space or a coherence function of only an echo signal. The echo suppressor 19 calculates a suppression gain by using the estimated acoustic coupling amount, the output signal of the nonlinear echo suppression unit 18, and the reception signal. By multiplying the output signal of the nonlinear echo suppression unit 18 by the calculated suppression gain, the echo suppressor 19 suppresses the residual linear echo signal that has not been suppressed by the echo canceller 14. The echo suppressor 19 outputs the input signal with only the residual linear echo signal suppressed therefrom to the output terminal 20.

Next, operation of the echo suppressing device 1 according to the first embodiment of the present disclosure will be described.

Figure 6:
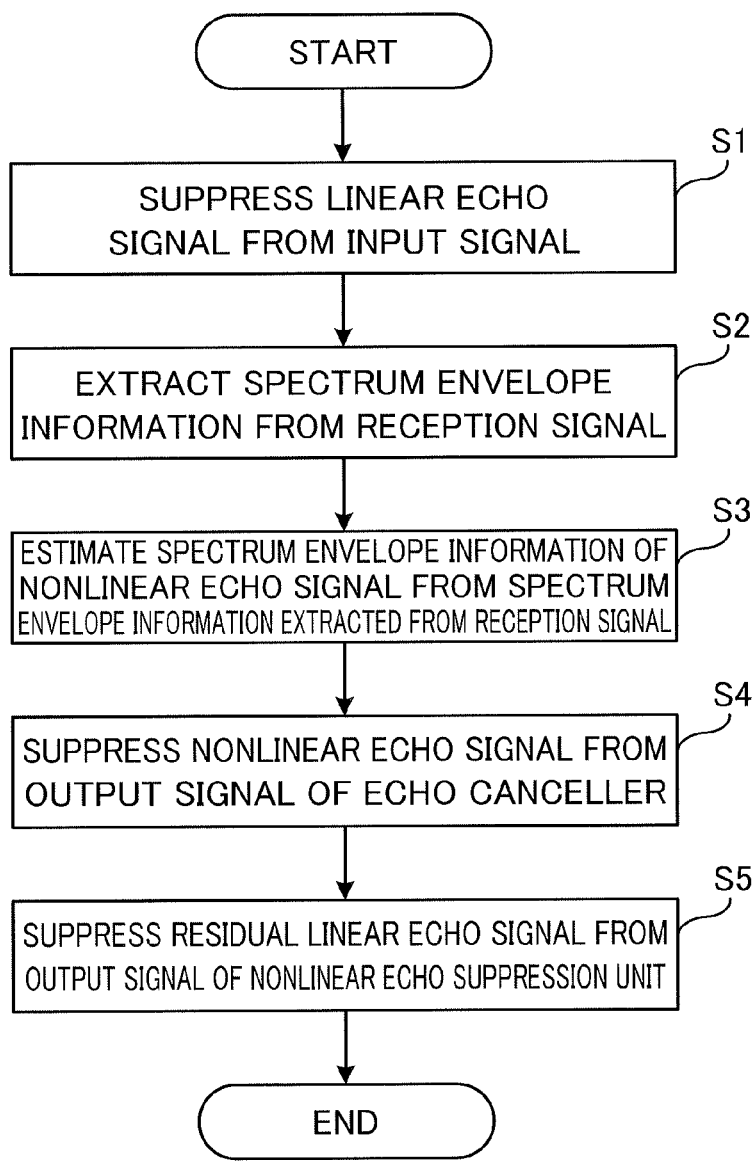
FIG. 6 is a flowchart for describing operation of an echo suppressing device in the first embodiment of the present disclosure.

FIG. 6 is a flowchart for explaining operation of the echo suppressing device 1 in the first embodiment of the present disclosure.

First, in Step S1, by estimating an amplitude component and a phase component of a linear echo signal included in an input signal acquired by the microphone 13, the echo canceller 14 suppresses the linear echo signal from the input signal.

Next, in Step S2, the spectrum envelope extraction unit 15 extracts the spectrum envelope information from a reception signal to be output to the loudspeaker 12.

Next, in Step S3, the nonlinear echo estimation unit 17 estimates spectrum envelope information of a nonlinear echo signal included in the input signal from the spectrum envelope information extracted from the reception signal by using the nonlinear echo model indicating the relationship between the spectrum envelope information extracted from the reception signal and spectrum envelope information of a nonlinear echo signal.

Next, in Step S4, the nonlinear echo suppression unit 18 uses the spectrum envelope information of the nonlinear echo signal estimated by the nonlinear echo estimation unit 17 to suppress the nonlinear echo signal from an output signal of the echo canceller 14.

Next, in Step S5, the echo suppressor 19 estimates an amplitude component of a residual linear echo signal that has not been suppressed by the echo canceller 14 to suppress the residual linear echo signal from an output signal of the nonlinear echo suppression unit 18. The echo suppressor 19 outputs the input signal from which only the residual linear echo signal has been suppressed to the output terminal 20 as a transmission signal.

As described above, the spectrum envelope information of the nonlinear echo signal included in the input signal is estimated from at least one of the spectrum envelope information extracted from the reception signal, the spectrum envelope information extracted from the input signal, and the spectrum envelope information extracted from the output signal of the echo canceller 14 by using the nonlinear echo model indicating the relationship between the spectrum envelope information of the nonlinear echo signal and at least one of the spectrum envelope information extracted from the reception signal to be output to the loudspeaker 12, the spectrum envelope information extracted from the input signal acquired by the microphone 13, and the spectrum envelope information extracted from the output signal of the echo canceller 14, and the nonlinear echo signal is suppressed from the output signal of the echo canceller 14 using the estimated spectrum envelope information of the nonlinear echo signal. Accordingly, a nonlinear echo signal included in an input signal acquired by the microphone 13 can be stably suppressed.

In addition, the echo suppressor 19 suppresses the residual linear echo signal from the output signal in which the nonlinear echo signal has been suppressed. It is accordingly possible to stabilize the operation of the echo suppressor 19, and improve suppression performance of a linear echo signal.

In addition, the number of dimensions of the spectrum envelope information extracted from the reception signal is smaller than the number of dimensions of the original reception signal, and the number of dimensions of the spectrum envelope information of the nonlinear echo signal is smaller than the number of dimensions of the nonlinear echo signal. Therefore, since the reception signal and the nonlinear echo signal are expressed by the spectrum envelope information, the memory usage can be reduced.

Subsequently, a learning method of the nonlinear echo model in the first embodiment will be described.

Figure 7:
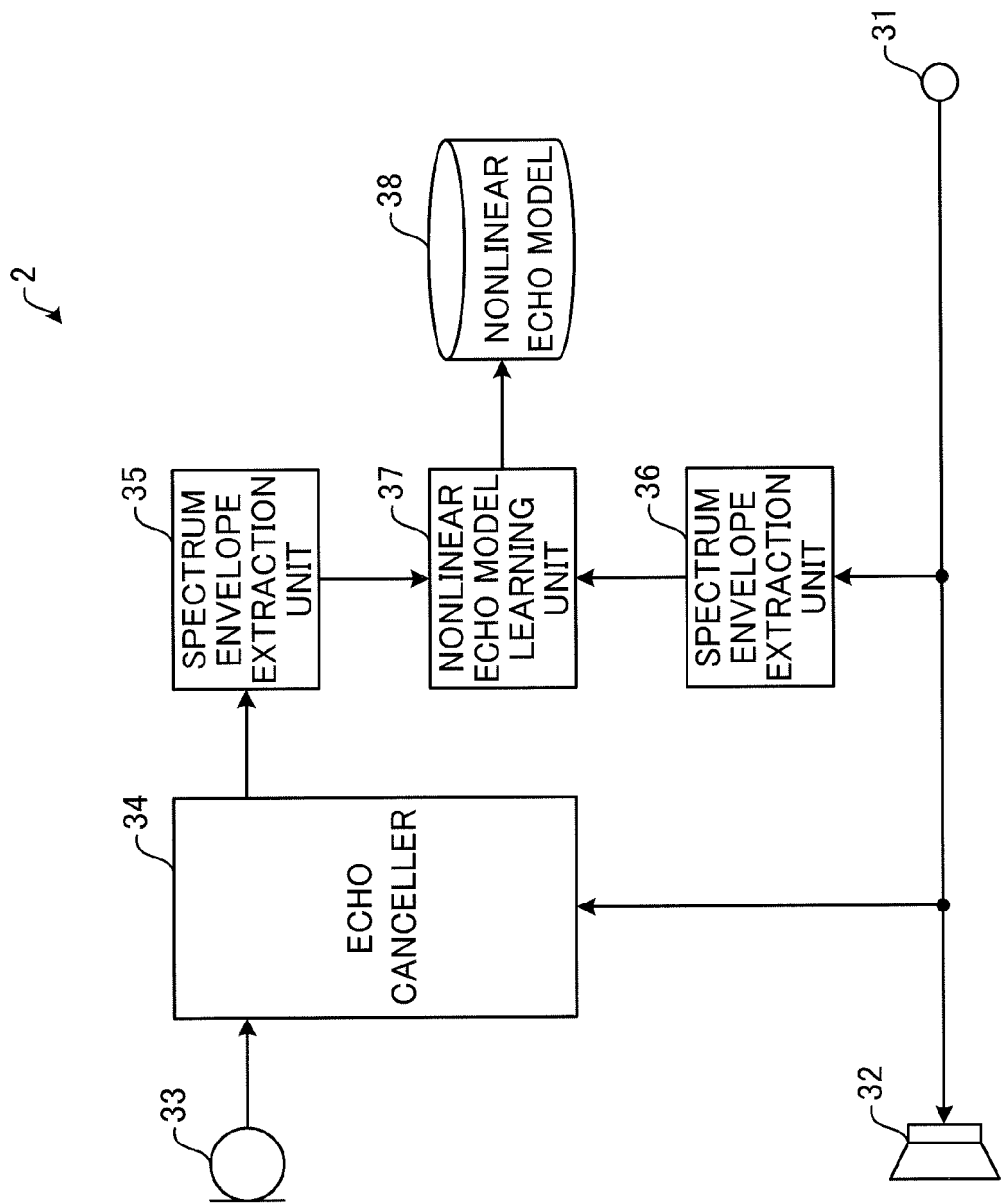
FIG. 7 is a diagram illustrating a configuration of a learning device in the first embodiment of the present disclosure.

FIG. 7 is a diagram illustrating a configuration of a learning device in the first embodiment of the present disclosure.

The learning device illustrated in FIG. 7 includes a nonlinear echo model production device 2, an input terminal 31, a loudspeaker 32, and a microphone 33.

The input terminal 31 outputs a reception signal received from the call device (not illustrated) on the call reception side to the nonlinear echo model production device 2.

The loudspeaker 32 outputs the input reception signal to the outside.

The microphone 33 is arranged in a space where a call transmission party is present, and collects a voice of the call transmission party. The microphone 33 outputs an input signal indicating the collected voice to the nonlinear echo model production device 2.

Note that configurations of the input terminal 31, the loudspeaker 32, and the microphone 33 are the same as the configurations of the input terminal 11, the loudspeaker 12, and the microphone 13 in FIG. 3.

The nonlinear echo model production device 2 includes an echo canceller 34, spectrum envelope extraction units 35 and 36, a nonlinear echo model learning unit 37, and a nonlinear echo model storage unit 38.

By estimating an amplitude component and a phase component of a linear echo signal included in the input signal acquired by the microphone 33, the echo canceller 34 suppresses the linear echo signal from the input signal. A configuration of the echo canceller 34 is the same as the configuration of the echo canceller 14 illustrated in FIG. 3. The echo canceller 34 outputs the input signal in which the linear echo signal has been suppressed to the spectrum envelope extraction unit 35.

The spectrum envelope extraction unit 35 extracts spectrum envelope information from an output signal of the echo canceller 34. The spectrum envelope extraction unit 35 outputs the spectrum envelope information extracted from the output signal of the echo canceller 34 to the nonlinear echo model learning unit 37.

The spectrum envelope extraction unit 36 extracts spectrum envelope information from the reception signal to be output to the loudspeaker 32. The spectrum envelope extraction unit 36 outputs the spectrum envelope information extracted from the reception signal to the nonlinear echo model learning unit 37.

The nonlinear echo model learning unit 37 learns a nonlinear echo model by using, as the teacher data, at least one of the spectrum envelope information extracted from the reception signal, the spectrum envelope information extracted from the input signal, and the spectrum envelope information extracted from the output signal of the echo canceller 34, and the spectrum envelope information extracted from the output signal of the echo canceller 34 that suppresses the linear echo signal from the input signal, using, as an input, at least one of the spectrum envelope information extracted from the reception signal, the spectrum envelope information extracted from the input signal, and the spectrum envelope information extracted from the output signal of the echo canceller 34, and using the spectrum envelope information of the nonlinear echo signal as an output.

The nonlinear echo model learning unit 37 in the first embodiment uses, as the teacher data, the spectrum envelope information extracted from the reception signal and the spectrum envelope information extracted from the output signal of the echo canceller 34 that suppresses the linear echo signal from the input signal. When the spectrum envelope information extracted from the reception signal by the spectrum envelope extraction unit 36 is input, the nonlinear echo model learning unit 37 learns the nonlinear echo model so as to output the spectrum envelope information of the nonlinear echo signal extracted from the output signal of the echo canceller 34 by the spectrum envelope extraction unit 35.

The nonlinear echo model is a neural network learned using, as the teacher data, the spectrum envelope information extracted from the reception signal and the spectrum envelope information extracted from the output signal of the echo canceller 34. The echo canceller 34 is capable of suppressing only a linear echo signal. Therefore, the output signal (residual echo signal) of the echo canceller 34 is substantially equal to the nonlinear echo signal. Thus, the nonlinear echo model learning unit 37 is capable of modeling a relationship between the spectrum envelope information extracted from the reception signal and the spectrum envelope information of the nonlinear echo signal.

Examples of machine learning include supervised learning in which a relationship between an input and an output is learned using teacher data in which a label (output information) is assigned to input information, unsupervised learning in which a data structure is constructed only by an unlabeled input, semi-supervised learning in which both labeled and unlabeled input are handled, and reinforcement learning in which an action that maximizes a reward is learned by trial and error. In addition, specific methods of the machine learning include a neural network (including deep learning using a multilayer neural network), genetic programming, a decision tree, a Bayesian network, or a support vector machine (SVM). In the machine learning of the nonlinear echo model, any of the specific examples described above may be used.

The nonlinear echo model learning unit 37 stores the learned nonlinear echo model in the nonlinear echo model storage unit 38.

The nonlinear echo model storage unit 38 stores the nonlinear echo model learned by the nonlinear echo model learning unit 37.

Note that the echo suppressing device 1 illustrated in FIG. 3 may include the spectrum envelope extraction unit 35 and the nonlinear echo model learning unit 37. In this case, the echo suppressing device 1 may further include a mode switching unit that switches a mode between a learning mode and an echo suppression mode. When the mode is switched to the learning mode by the mode switching unit, the echo canceller 14 outputs the output signal to the spectrum envelope extraction unit 35. The nonlinear echo model learning unit 37 may learn the nonlinear echo model by using, as the teacher data, the spectrum envelope information extracted from the output signal from which the linear echo signal has been suppressed by the echo canceller 14 and the spectrum envelope information extracted from the reception signal.

In addition, the nonlinear echo model learned by the learning device may be stored in advance in the nonlinear echo model storage unit 16 of the echo suppressing device 1. In addition, the echo suppressing device 1 may receive the nonlinear echo model learned by the learning device and update the nonlinear echo model stored in the nonlinear echo model storage unit 16.

The nonlinear echo model production device 2 may further include an echo suppressor. In this case, the echo canceller 34 may estimate an amplitude component and a phase component of a linear echo signal included in the input signal acquired by the microphone 33 to suppress the linear echo signal from the input signal. The echo canceller 34 may output the input signal with the linear echo signal suppressed to the echo suppressor. The echo suppressor may estimate an amplitude component of a residual linear echo signal that has not been suppressed by the echo canceller 34 to suppress the residual linear echo signal from the input signal. A configuration of the echo suppressor is the same as the configuration of the echo suppressor 19 illustrated in FIG. 3. The echo suppressor may output an input signal from which only the residual linear echo signal has been suppressed to the spectrum envelope extraction unit 35. The spectrum envelope extraction unit 35 may extract the spectrum envelope information from an output signal of the echo suppressor. The spectrum envelope extraction unit 35 may output the spectrum envelope information extracted from the output signal of the echo suppressor to the nonlinear echo model learning unit 37.

Then, the nonlinear echo model learning unit 37 may learn a nonlinear echo model by using, as the teacher data, at least one of the spectrum envelope information extracted from the reception signal, the spectrum envelope information extracted from the input signal, and the spectrum envelope information extracted from the output signal of the echo canceller 34, and the spectrum envelope information extracted from the output signal of the echo suppressor that suppresses the residual linear echo signal from the output signal of the echo canceller 34 that suppresses the linear echo signal from the input signal, using, as an input, at least one of the spectrum envelope information extracted from the reception signal, the spectrum envelope information extracted from the input signal, and the spectrum envelope information extracted from the output signal of the echo canceller 34, and using the spectrum envelope information of the nonlinear echo signal as an output.

Figure 8:
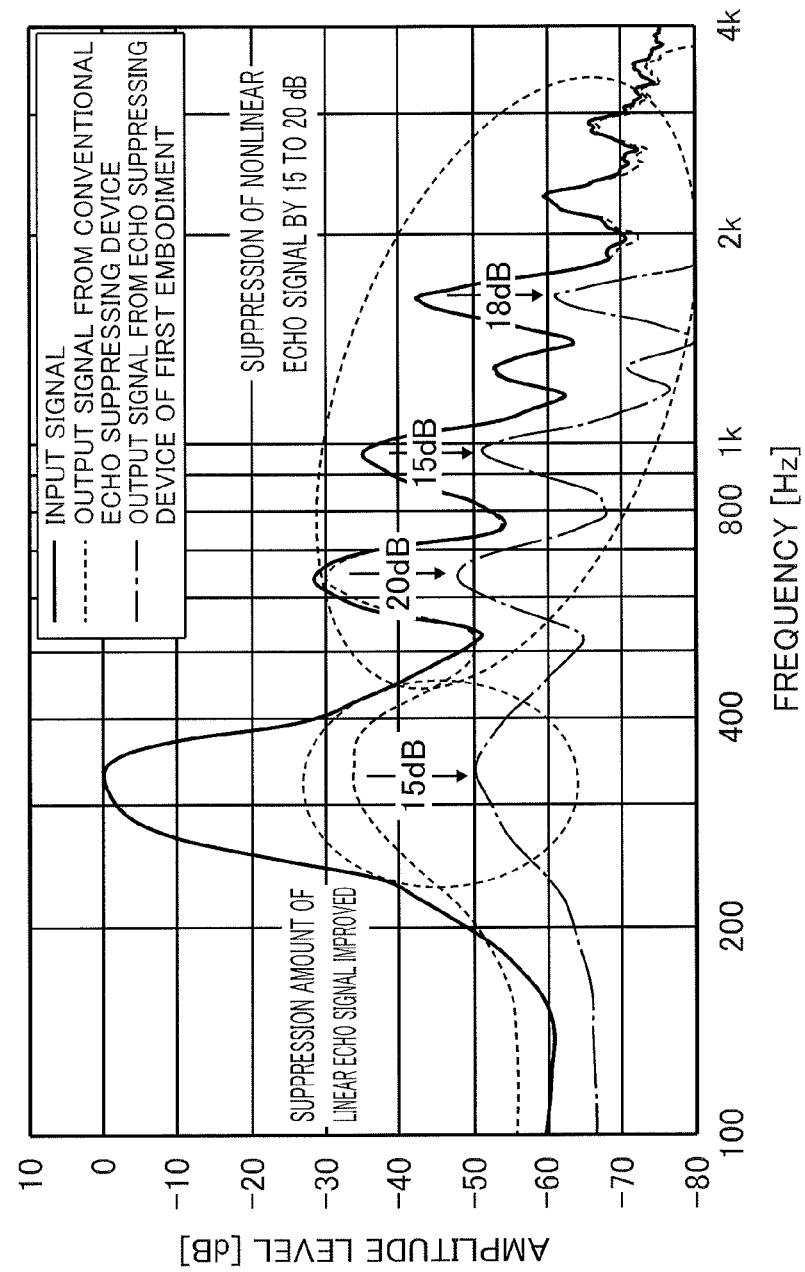
FIG. 8 is a diagram illustrating a result of frequency analysis of an output signal from a conventional echo suppressing device and an output signal from the echo suppressing device of the first embodiment.

FIG. 8 is a diagram illustrating a result of frequency analysis of an output signal from a conventional echo suppressing device and an output signal from the echo suppressing device 1 of the first embodiment. In FIG. 8, the horizontal axis represents frequency, and the vertical axis represents amplitude level. In FIG. 8, a solid line represents an input signal from the microphone 13, a broken line represents an output signal from a conventional echo suppressing device, and a dashed line represents an output signal from the echo suppressing device 1 of the first embodiment. Furthermore, the reception signal is ⅓ octave band noise with a center frequency of 315 Hz.

As illustrated in FIG. 8, in the echo suppressing device 1 of the first embodiment, a suppression effect of 15 dB to 20 dB exceeding a target value is obtained with respect to harmonic distortion that is a nonlinear echo signal. Furthermore, in the echo suppressing device 1 of the first embodiment, a suppression effect of about 15 dB higher than that of a conventional echo suppressing device is obtained even for a linear echo signal of 315 Hz. This is considered to be resulted from stable estimation of the acoustic coupling amount in the echo suppressor 19 at the subsequent stage of the nonlinear echo suppression unit 18 of the first embodiment because of the suppression of the nonlinear echo signal by the nonlinear echo suppression unit.

As described in the foregoing, the echo suppressing device 1 of the first embodiment enables a comfortable call even with a loudspeaker with much distortion, and can contribute to high quality, miniaturization, and low cost of a notebook computer, a web conference system, a mobile phone, and the like.

Note that it is also possible to increase learning parameters of the nonlinear echo model by an effect of reducing an information amount of a feature value by extracting a spectrum envelope. For example, when the nonlinear model is a neural network, the number of intermediate layers can be increased.

Second Embodiment

The nonlinear echo estimation unit 17 in the first embodiment estimates spectrum envelope information of the nonlinear echo signal included in the input signal from the spectrum envelope information extracted from the reception signal using the nonlinear echo model indicating the relationship between the spectrum envelope information extracted from the reception signal and the spectrum envelope information of the nonlinear echo signal. By contrast, using a nonlinear echo model indicating a relationship between spectrum envelope information extracted from a reception signal and spectrum envelope information extracted from an input signal, and spectrum envelope information of a nonlinear echo signal, a nonlinear echo estimation unit in a second embodiment estimates spectrum envelope information of a nonlinear echo signal included in the input signal from the spectrum envelope information extracted from the reception signal and the spectrum envelope information extracted from the input signal.

Figure 9:
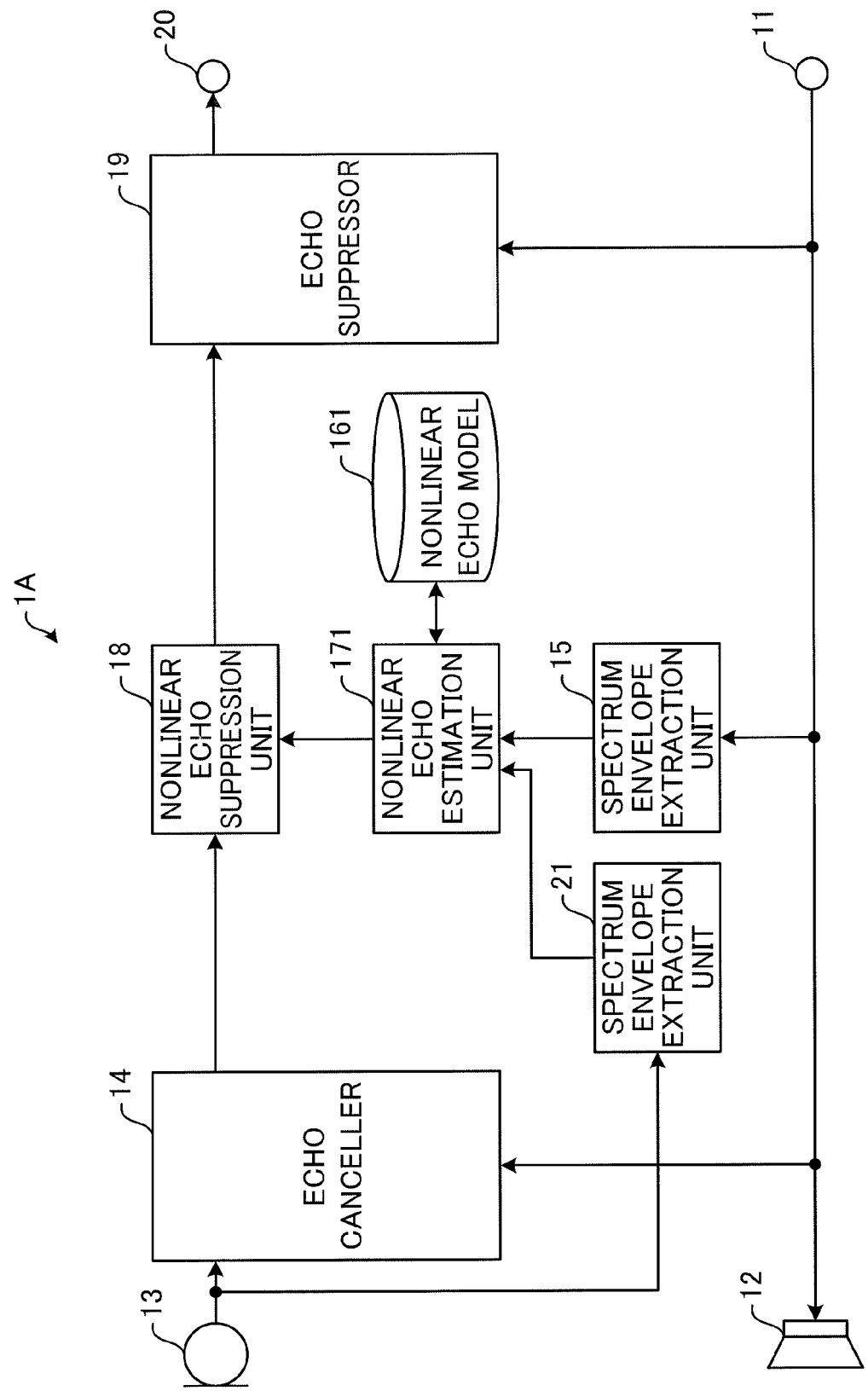
FIG. 9 is a diagram illustrating a configuration of a call device in a second embodiment of the present disclosure.

FIG. 9 is a diagram illustrating a configuration of a call device in the second embodiment of the present disclosure.

The call device illustrated in FIG. 9 includes an echo suppressing device 1A, the input terminal 11, the loudspeaker 12, the microphone 13, and the output terminal 20. In the second embodiment, the same components as those in the first embodiment will be denoted by the same reference signs as those in the first embodiment, and description thereof will be omitted.

The echo suppressing device 1A includes the echo canceller 14, spectrum envelope extraction units 15 and 21, a nonlinear echo model storage unit 161, a nonlinear echo estimation unit 171, the nonlinear echo suppression unit 18, and the echo suppressor 19.

The microphone 13 outputs an input signal to the echo canceller 14, and outputs the input signal to the spectrum envelope extraction unit 21.

The spectrum envelope extraction unit 21 extracts spectrum envelope information from the input signal acquired by the microphone 13. The spectrum envelope extraction unit 21 extracts the spectrum envelope information from the input signal by the linear predictive coding analysis method. Note that a configuration of the spectrum envelope extraction unit 21 is the same as the configuration of the spectrum envelope extraction unit 15. The spectrum envelope extraction unit 21 outputs the spectrum envelope information extracted from the input signal to the nonlinear echo estimation unit 171.

The nonlinear echo model storage unit 161 in the second embodiment stores in advance a nonlinear echo model indicating a relationship between spectrum envelope information extracted from a reception signal to be output to the loudspeaker 12 and spectrum envelope information extracted from the input signal acquired by the microphone 13, and spectrum envelope information of a nonlinear echo signal. The nonlinear echo model is, for example, a neural network.

The nonlinear echo model in the second embodiment is learned by using, as the teacher data, the spectrum envelope information extracted from the reception signal, the spectrum envelope information extracted from the input signal, and spectrum envelope information extracted from an output signal of an echo canceller that suppresses a linear echo signal from the input signal, using, as an input, the spectrum envelope information extracted from the reception signal and the spectrum envelope information extracted from the input signal, and using the spectrum envelope information of the nonlinear echo signal as an output.

In a learning method of the nonlinear echo model according to the second embodiment, the spectrum envelope information extracted from the reception signal and the spectrum envelope information extracted from the input signal are input to the nonlinear echo model learning unit 37 illustrated in FIG. 7. Then, the nonlinear echo model learning unit 37 in the second embodiment uses, as the teacher data, the spectrum envelope information extracted from the reception signal, the spectrum envelope information extracted from the input signal, and the spectrum envelope information extracted from the output signal of the echo canceller 34 that suppresses the linear echo signal from the input signal. The nonlinear echo model learning unit 37 learns the nonlinear echo model so as to output spectrum envelope information of a nonlinear echo signal extracted from the output signal of the echo canceller 34 when the spectrum envelope information extracted from the reception signal and the spectrum envelope information extracted from the input signal are input.

The nonlinear echo estimation unit 171 estimates spectrum envelope information of the nonlinear echo signal included in the input signal from the spectrum envelope information extracted from the reception signal and the spectrum envelope information of the input signal by using the nonlinear echo model indicating the relationship between the spectrum envelope information extracted from the reception signal and the spectrum envelope information extracted from the input signal, and the spectrum envelope information of the nonlinear echo signal.

The nonlinear echo estimation unit 171 reads the nonlinear echo model from the nonlinear echo model storage unit 161. The nonlinear echo estimation unit 171 acquires the spectrum envelope information of the nonlinear echo signal from the nonlinear echo model by inputting, to the nonlinear echo model, the spectrum envelope information extracted from the reception signal output from the spectrum envelope extraction unit 15 and spectrum envelope information extracted from an input signal output from the spectrum envelope extraction unit 21. The nonlinear echo estimation unit 171 outputs, to the nonlinear echo suppression unit 18, the spectrum envelope information of the nonlinear echo signal estimated using the spectrum envelope information extracted from the reception signal and the spectrum envelope information extracted from the input signal.

Note that operation of the echo suppressing device 1A in the second embodiment is different in the processing of Steps S2 and S3 illustrated in FIG. 6. Specifically, in the second embodiment, in Step S2, the spectrum envelope extraction unit 15 extracts the spectrum envelope information from the reception signal to be output to the loudspeaker 12, and the spectrum envelope extraction unit 21 extracts the spectrum envelope information from the input signal acquired by the microphone 13. Then, in Step S3, by using the nonlinear echo model indicating the relationship between the spectrum envelope information extracted from the reception signal and the spectrum envelope information extracted from the input signal, and the spectrum envelope information of the nonlinear echo signal, the nonlinear echo estimation unit 171 estimates spectrum envelope information of the nonlinear echo signal from the spectrum envelope information extracted from the reception signal and the spectrum envelope information of the input signal.

The number of dimensions of the spectrum envelope information can be significantly reduced compared with the number of dimensions of a signal before extraction or the number of dimensions of a signal converted into a frequency domain. Therefore, the number of input signals handled by the nonlinear echo model can be increased without increasing a memory usage. In the second embodiment, since two signals (the spectrum envelope information of the reception signal and the spectrum envelope information of the input signal) are input to the nonlinear echo model, estimation accuracy of a nonlinear echo signal can be further improved.

Third Embodiment

The nonlinear echo estimation unit 17 in the first embodiment estimates spectrum envelope information of the nonlinear echo signal included in the input signal from the spectrum envelope information extracted from the reception signal using the nonlinear echo model indicating the relationship between the spectrum envelope information extracted from the reception signal and the spectrum envelope information of the nonlinear echo signal. By contrast, using a nonlinear echo model indicating a relationship between spectrum envelope information extracted from a reception signal and spectrum envelope information extracted from an output signal of an echo canceller, and spectrum envelope information of a nonlinear echo signal, a nonlinear echo estimation unit in a third embodiment estimates spectrum envelope information of a nonlinear echo signal included in an input signal from the spectrum envelope information extracted from the reception signal and the spectrum envelope information extracted from the output signal of the echo canceller 14.

Figure 10:
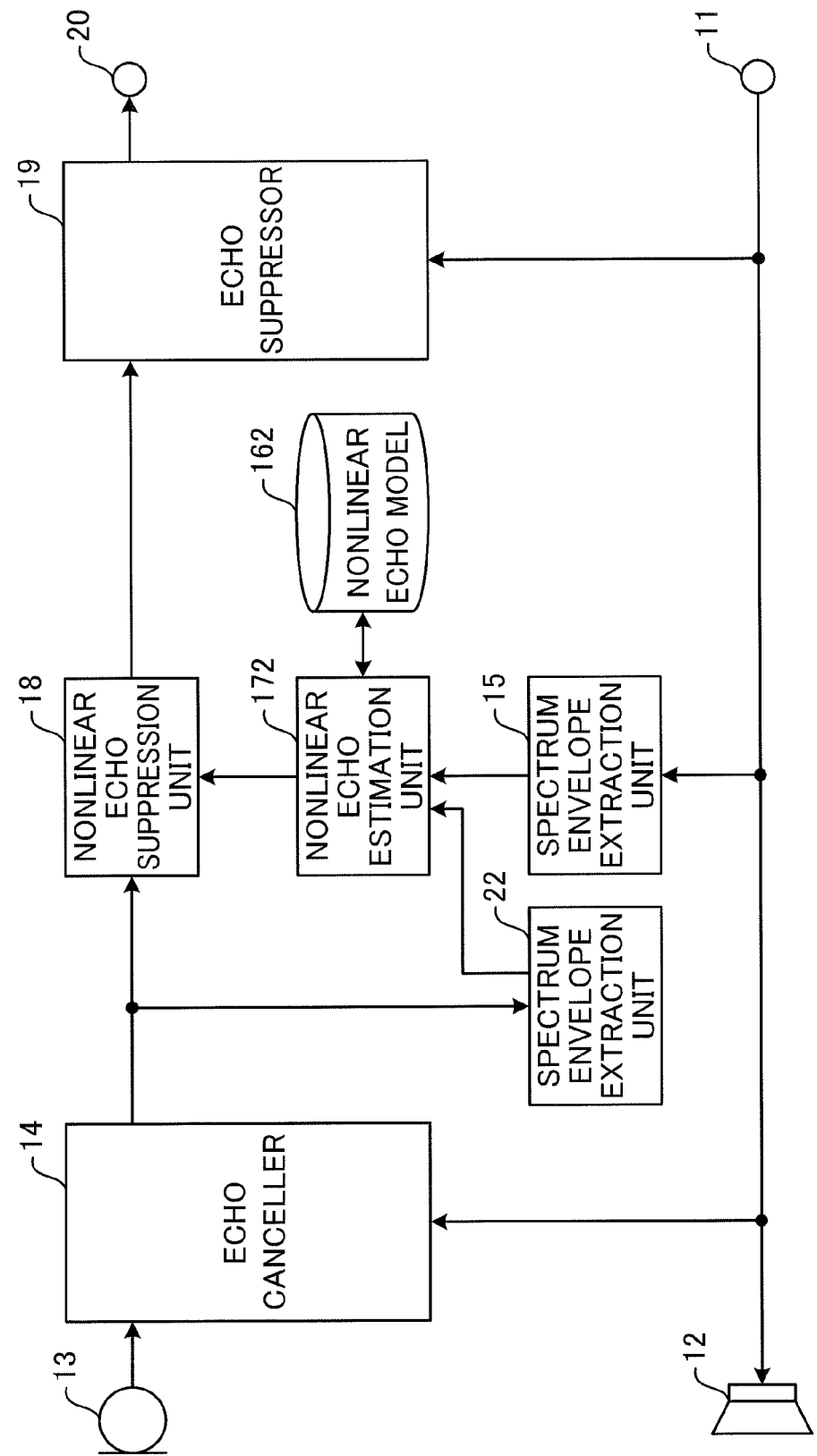
FIG. 10 is a diagram illustrating a configuration of a call device in a third embodiment of the present disclosure.

FIG. 10 is a diagram illustrating a configuration of a call device in the third embodiment of the present disclosure.

The call device illustrated in FIG. 10 includes an echo suppressing device 1B, the input terminal 11, the loudspeaker 12, the microphone 13, and the output terminal 20. In the third embodiment, the same components as those in the first embodiment will be denoted by the same reference signs as those in the first embodiment, and description thereof will be omitted.

The echo suppressing device 1B includes the echo canceller 14, spectrum envelope extraction units 15 and 22, a nonlinear echo model storage unit 162, a nonlinear echo estimation unit 172, the nonlinear echo suppression unit 18, and the echo suppressor 19.

The spectrum envelope extraction unit 22 extracts spectrum envelope information from an output signal of the echo canceller 14. The spectrum envelope extraction unit 22 extracts the spectrum envelope information from the output signal of the echo canceller 14 by the linear predictive coding analysis method. Note that a configuration of the spectrum envelope extraction unit 22 is the same as the configuration of the spectrum envelope extraction unit 15. The spectrum envelope extraction unit 22 outputs the spectrum envelope information extracted from the output signal of the echo canceller 14 to the nonlinear echo estimation unit 172.

The nonlinear echo model storage unit 162 stores in advance a nonlinear echo model indicating a relationship between spectrum envelope information extracted from a reception signal to be output to the loudspeaker 12 and spectrum envelope information extracted from an output signal of an echo canceller, and spectrum envelope information of a nonlinear echo signal. The nonlinear echo model is, for example, a neural network.

The nonlinear echo model in the third embodiment is learned by using, as the teacher data, the spectrum envelope information extracted from the reception signal, spectrum envelope information extracted from an output signal of an echo canceller that suppresses a linear echo signal from the input signal, the spectrum envelope information extracted from the output signal of the echo canceller, using, as an input, the spectrum envelope information extracted from the reception signal and the spectrum envelope information extracted from the output signal of the echo canceller, and using, as an output, the spectrum envelope information of the nonlinear echo signal.

In a learning method of the nonlinear echo model in the third embodiment, the spectrum envelope information extracted from the reception signal and the spectrum envelope information extracted from the output signal of the echo canceller 34 are input to the nonlinear echo model learning unit 37 illustrated in FIG. 7. Then, the nonlinear echo model learning unit 37 in the third embodiment uses, as the teacher data, the spectrum envelope information extracted from the reception signal, the spectrum envelope information extracted from the output signal of the echo canceller 34 that suppresses the linear echo signal from the input signal, and the spectrum envelope information extracted from the output signal of the echo canceller 34. The nonlinear echo model learning unit 37 learns the nonlinear echo model so as to output the spectrum envelope information of the nonlinear echo signal extracted from the output signal of the echo canceller 34 when the spectrum envelope information extracted from the reception signal and the spectrum envelope information extracted from the output signal of the echo canceller 34 are input.

The nonlinear echo estimation unit 172 estimates spectrum envelope information of the nonlinear echo signal included in the input signal from the spectrum envelope information extracted from the reception signal and the spectrum envelope information extracted from the output signal of the echo canceller 14 using the nonlinear echo model indicating the relationship between the spectrum envelope information extracted from the reception signal and the spectrum envelope information extracted from the output signal of the echo canceller, and the spectrum envelope information of the nonlinear echo signal.

The nonlinear echo estimation unit 172 reads the nonlinear echo model from the nonlinear echo model storage unit 162. The nonlinear echo estimation unit 172 acquires the spectrum envelope information of the nonlinear echo signal from the nonlinear echo model by inputting, to the nonlinear echo model, the spectrum envelope information extracted from the reception signal output from the spectrum envelope extraction unit 15 and the spectrum envelope information extracted from the output signal of the echo canceller 14, the output signal being output from the spectrum envelope extraction unit 22. The nonlinear echo estimation unit 172 outputs, to the nonlinear echo suppression unit 18, the spectrum envelope information of the nonlinear echo signal estimated using the spectrum envelope information extracted from the reception signal and the spectrum envelope information extracted from the output signal of the echo canceller 14.

Note that operation of the echo suppressing device 1B in the third embodiment is different in the processing of Steps S2 and S3 illustrated in FIG. 6. Specifically, in the third embodiment, in Step S2, the spectrum envelope extraction unit 15 extracts the spectrum envelope information from the reception signal to be output to the loudspeaker 12, and the spectrum envelope extraction unit 22 extracts the spectrum envelope information from the output signal of the echo canceller 14. Then, in Step S3, the nonlinear echo estimation unit 172 estimates spectrum envelope information of the nonlinear echo signal from the spectrum envelope information extracted from the reception signal and the spectrum envelope information extracted from the output signal of the echo canceller 14 using the nonlinear echo model indicating the relationship between the spectrum envelope information extracted from the reception signal and the spectrum envelope information extracted from the output signal of the echo canceller 14, and the spectrum envelope information of the nonlinear echo signal.

In the third embodiment, since two signals (the spectrum envelope information of the reception signal and the spectrum envelope information of the output signal of the echo canceller 14) are input to the nonlinear echo model, the estimation accuracy of a nonlinear echo signal can be further improved.

Fourth Embodiment

The nonlinear echo estimation unit 17 in the first embodiment estimates spectrum envelope information of the nonlinear echo signal included in the input signal from the spectrum envelope information extracted from the reception signal using the nonlinear echo model indicating the relationship between the spectrum envelope information extracted from the reception signal and the spectrum envelope information of the nonlinear echo signal. By contrast, using a nonlinear echo model indicating a relationship between spectrum envelope information extracted from a reception signal, spectrum envelope information extracted from an input signal and spectrum envelope information extracted from an output signal of an echo canceller, and spectrum envelope information of a nonlinear echo signal, a nonlinear echo estimation unit in a fourth embodiment estimates spectrum envelope information of a nonlinear echo signal included in the input signal from the spectrum envelope information extracted from the reception signal, the spectrum envelope information extracted from the input signal, and the spectrum envelope information extracted from the output signal of the echo canceller 14.

Figure 11:
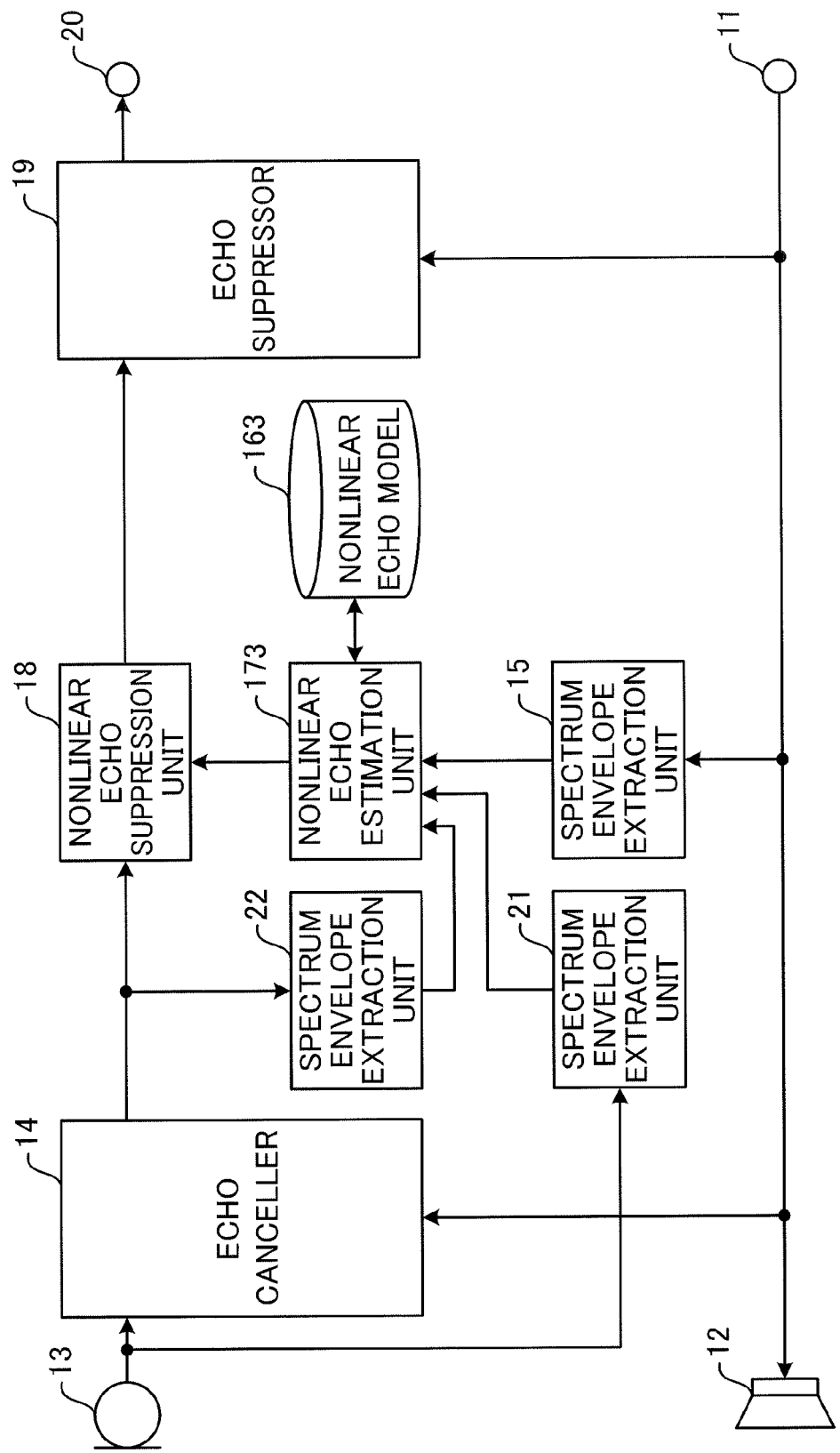
FIG. 11 is a diagram illustrating a configuration of a call device in a fourth embodiment of the present disclosure.

FIG. 11 is a diagram illustrating a configuration of a call device in the fourth embodiment of the present disclosure.

The call device illustrated in FIG. 11 includes an echo suppressing device 1C, the input terminal 11, the loudspeaker 12, the microphone 13, and the output terminal 20. In the fourth embodiment, the same components as those in the first to third embodiments will be denoted by the same reference signs as those in the first to third embodiments, and description thereof will be omitted.

The echo suppressing device 1C includes the echo canceller 14, the spectrum envelope extraction units 15, 21 and 22, a nonlinear echo model storage unit 163, a nonlinear echo estimation unit 173, the nonlinear echo suppression unit 18, and the echo suppressor 19.

The nonlinear echo model storage unit 163 stores in advance a nonlinear echo model indicating a relationship between spectrum envelope information extracted from a reception signal to be output to the loudspeaker 12, spectrum envelope information extracted from an input signal acquired by the microphone 13 and spectrum envelope information extracted from an output signal of the echo canceller, and spectrum envelope information of a nonlinear echo signal. The nonlinear echo model is, for example, a neural network.

The nonlinear echo model in the fourth embodiment is learned by using, as the teacher data, the spectrum envelope information extracted from the reception signal, the spectrum envelope information extracted from the input signal, spectrum envelope information extracted from an output signal of an echo canceller that suppresses a linear echo signal from the input signal, and the spectrum envelope information extracted from the output signal of the echo canceller, using, as an input, the spectrum envelope information extracted from the reception signal, the spectrum envelope information extracted from the input signal, and the spectrum envelope information extracted from the output signal of the echo canceller, and using the spectrum envelope information of the nonlinear echo signal as an output.

Using the nonlinear echo model indicating the relationship between the spectrum envelope information extracted from the reception signal, the spectrum envelope information extracted from the input signal and the spectrum envelope information extracted from the output signal of the echo canceller, and the spectrum envelope information of the nonlinear echo signal, the nonlinear echo estimation unit 173 estimates spectrum envelope information of the nonlinear echo signal included in the input signal from the spectrum envelope information extracted from the reception signal, the spectrum envelope information extracted from the input signal, and the spectrum envelope information extracted from the output signal of the echo canceller 14.

The nonlinear echo estimation unit 173 reads the nonlinear echo model from the nonlinear echo model storage unit 163. The nonlinear echo estimation unit 173 acquires the spectrum envelope information of the nonlinear echo signal from the nonlinear echo model by inputting, to the nonlinear echo model, the spectrum envelope information extracted from the reception signal output from the spectrum envelope extraction unit 15, the spectrum envelope information extracted from the input signal output from the spectrum envelope extraction unit 21, and the spectrum envelope information extracted from the output signal of the echo canceller 14, the output signal being output from the spectrum envelope extraction unit 22. The nonlinear echo estimation unit 173 outputs, to the nonlinear echo suppression unit 18, the spectrum envelope information of the nonlinear echo signal estimated using the spectrum envelope information extracted from the reception signal, the spectrum envelope information extracted from the input signal, and the spectrum envelope information extracted from the output signal of the echo canceller 14.

Note that operation of the echo suppressing device 1C in the fourth embodiment is different in the processing of Steps S2 and S3 illustrated in FIG. 6. Specifically, in the fourth embodiment, in Step S2, the spectrum envelope extraction unit 15 extracts the spectrum envelope information from the reception signal to be output to the loudspeaker 12, the spectrum envelope extraction unit 21 extracts the spectrum envelope information from the input signal acquired by the microphone 13, and the spectrum envelope extraction unit 22 extracts the spectrum envelope information from the output signal of the echo canceller 14. Then, in Step S3, using the nonlinear echo model indicating the relationship between the spectrum envelope information extracted from the reception signal, the spectrum envelope information extracted from the input signal and the spectrum envelope information extracted from the output signal of the echo canceller 14, and the spectrum envelope information of the nonlinear echo signal, the nonlinear echo estimation unit 172 estimates spectrum envelope information of the nonlinear echo signal from the spectrum envelope information extracted from the reception signal, the spectrum envelope information extracted from the input signal, and the spectrum envelope information extracted from the output signal of the echo canceller 14.

Next, a learning method of the nonlinear echo model in the fourth embodiment will be described.

Figure 12:
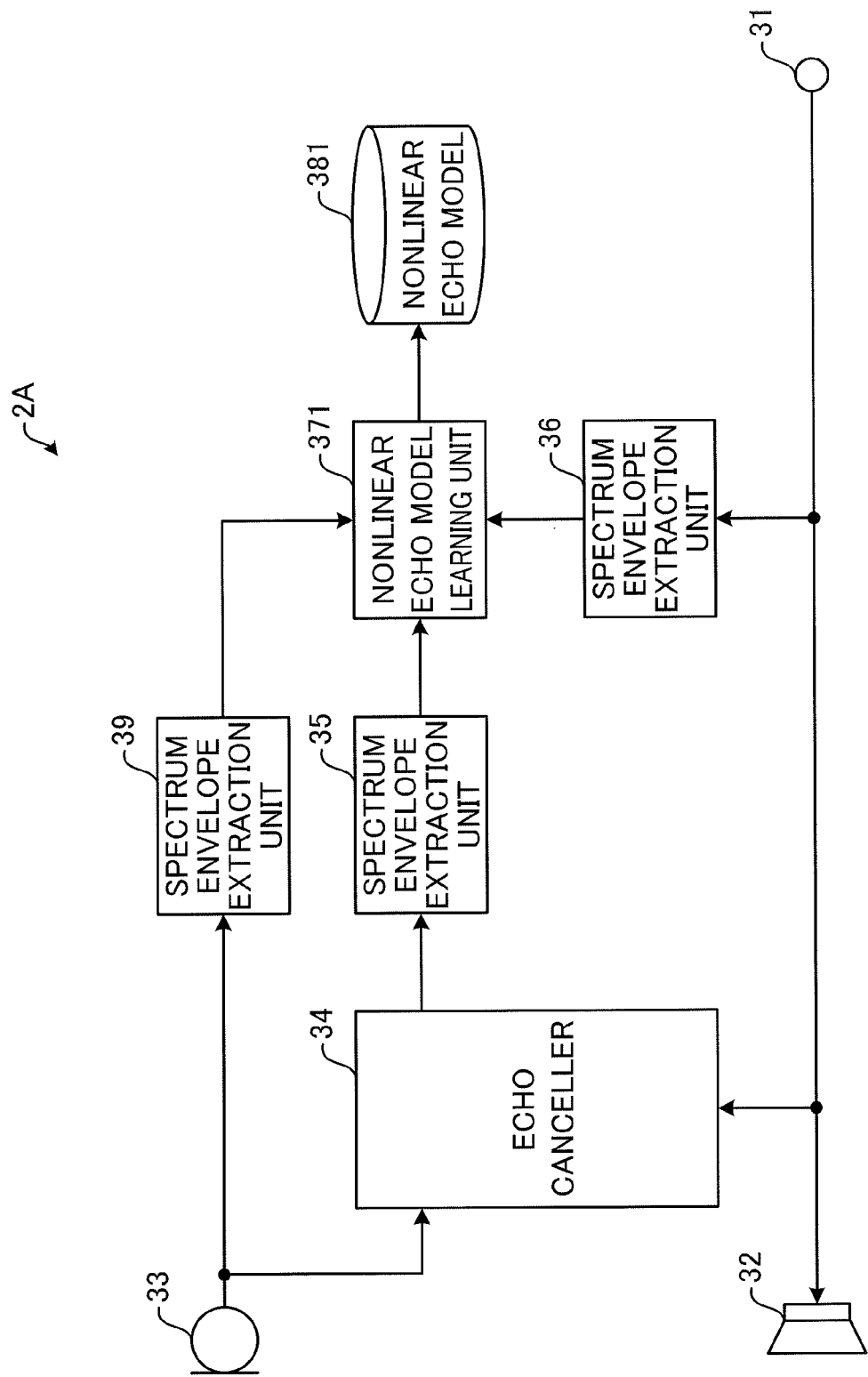
FIG. 12 is a diagram illustrating a configuration of a learning device in the fourth embodiment of the present disclosure.

FIG. 12 is a diagram illustrating a configuration of a learning device in the fourth embodiment of the present disclosure.

The learning device illustrated in FIG. 12 includes a nonlinear echo model production device 2A, the input terminal 31, the loudspeaker 32, and the microphone 33.

The nonlinear echo model production device 2A includes the echo canceller 34, spectrum envelope extraction units 35, 36 and 39, a nonlinear echo model learning unit 371, and a nonlinear echo model storage unit 381.

The spectrum envelope extraction unit 39 extracts spectrum envelope information from an input signal acquired by the microphone 33. The spectrum envelope extraction unit 39 outputs the spectrum envelope information extracted from the input signal to the nonlinear echo model learning unit 371.

In the learning method of the nonlinear echo model in the fourth embodiment, spectrum envelope information extracted from a reception signal, the spectrum envelope information extracted from the input signal, and spectrum envelope information extracted from an output signal of the echo canceller 34 are input to the nonlinear echo model learning unit 371 illustrated in FIG. 12.

The nonlinear echo model learning unit 371 learns the nonlinear echo model using, as the teacher data, the spectrum envelope information extracted from the reception signal, the spectrum envelope information extracted from the input signal, and the spectrum envelope information extracted from the output signal of the echo canceller 34 that suppresses the linear echo signal from the input signal, using, as an input, the spectrum envelope information extracted from the reception signal, the spectrum envelope information extracted from the input signal, and the spectrum envelope information extracted from the output signal of the echo canceller 34, and using the spectrum envelope information of the nonlinear echo signal as an output.

In the fourth embodiment, the output signal of the echo canceller 34 includes a first output signal obtained by suppressing a linear echo signal from an input signal that does not includes voice information and is input by the microphone 33, and a second output signal obtained by suppressing a linear echo signal from an input signal including the voice information.

The nonlinear echo model learning unit 371 uses, as the teacher data, the spectrum envelope information extracted from the reception signal, the spectrum envelope information extracted from the input signal, and spectrum envelope information extracted from the first output signal of the echo canceller 34 that suppresses the linear echo signal from the input signal not including voice information. The nonlinear echo model learning unit 371 learns the nonlinear echo model so as to output the spectrum envelope information of the nonlinear echo signal extracted from the first output signal of the echo canceller 34 by the spectrum envelope extraction unit 35 when the spectrum envelope information extracted from the reception signal by the spectrum envelope extraction unit 36, the spectrum envelope information extracted from the input signal by the spectrum envelope extraction unit 39, and the spectrum envelope information extracted from the first output signal of the echo canceller 34 by the spectrum envelope extraction unit 35 arc input. The nonlinear echo model learning unit 371 also uses, as the teacher data, the spectrum envelope information extracted from the reception signal, the spectrum envelope information extracted from the input signal, the spectrum envelope information extracted from the first output signal of the echo canceller 34, the first output signal being obtained by suppressing the linear echo signal from the input signal not including voice information, and spectrum envelope information extracted from the second output signal of the echo canceller 34, the second output signal being obtained by suppressing the linear echo signal from the input signal including the voice information. The nonlinear echo model learning unit 371 learns the nonlinear echo model so as to output the spectrum envelope information of the nonlinear echo signal extracted from the first output signal of the echo canceller 34 by the spectrum envelope extraction unit 35 when the spectrum envelope information extracted from the reception signal by the spectrum envelope extraction unit 36, the spectrum envelope information extracted from the input signal by the spectrum envelope extraction unit 39, and the spectrum envelope information extracted from the second output signal of the echo canceller 34 by the spectrum envelope extraction unit 35 are input.

Specifically, when there are input the spectrum envelope information extracted from the reception signal, the spectrum envelope information extracted from the input signal, and the spectrum envelope information extracted from the first output signal of the echo canceller 34, the first output signal being obtained by suppressing the linear echo signal from the input signal not including voice information, the nonlinear echo model learning unit 371 learns the nonlinear echo model so as to output the spectrum envelope information extracted from the first output signal of the echo canceller 34. Furthermore, when there are input the spectrum envelope information extracted from the reception signal, the spectrum envelope information extracted from the input signal, and the spectrum envelope information extracted from the second output signal of the echo canceller 34, the second output signal being obtained by suppressing the linear echo signal from the input signal including the voice information, the nonlinear echo model learning unit 371 learns the nonlinear echo model so as to output the spectrum envelope information extracted from the first output signal of the echo canceller 34.

This makes it possible to predict the first output signal of the echo canceller 34 in which the linear echo signal is suppressed from the input signal not including voice information, i.e., predict a nonlinear echo component of the reception signal, regardless of whether or not the input signal acquired by the microphone includes voice information.

The nonlinear echo model learning unit 371 stores the learned nonlinear echo model in the nonlinear echo model storage unit 381.

The nonlinear echo model storage unit 381 stores the nonlinear echo model learned by the nonlinear echo model learning unit 371.

Note that the echo suppressing device 1C illustrated in FIG. 11 may include the nonlinear echo model learning unit 371. In this case, the echo suppressing device 1C may further include a mode switching unit that switches a mode between a learning mode and an echo suppression mode. When the mode is switched to the learning mode by the mode switching unit, the nonlinear echo model learning unit 371 may learn the nonlinear echo model using, as the teacher data, the spectrum envelope information extracted from the reception signal, the spectrum envelope information extracted from the input signal, and the spectrum envelope information extracted from the output signal of the echo canceller 14.

In the fourth embodiment, since three signals (the spectrum envelope information of the reception signal, the spectrum envelope information extracted from the input signal, and the spectrum envelope information of the output signal of the echo canceller 14) are input to the nonlinear echo model, the estimation accuracy of a nonlinear echo signal can be further improved.

Fifth Embodiment

The nonlinear echo estimation unit 17 in the first embodiment estimates spectrum envelope information of the nonlinear echo signal included in the input signal from the spectrum envelope information extracted from the reception signal using the nonlinear echo model indicating the relationship between the spectrum envelope information extracted from the reception signal and the spectrum envelope information of the nonlinear echo signal. By contrast, using a nonlinear echo model indicating a relationship between spectrum envelope information extracted from a reception signal and spectrum envelope information extracted from a pseudo linear echo signal from an adaptive filter of an echo canceller, and spectrum envelope information of a nonlinear echo signal, a nonlinear echo estimation unit in a fifth embodiment estimates spectrum envelope information of a nonlinear echo signal included in an input signal from the spectrum envelope information extracted from the reception signal and the spectrum envelope information extracted from the pseudo linear echo signal from the adaptive filter of the echo canceller.

Figure 13:
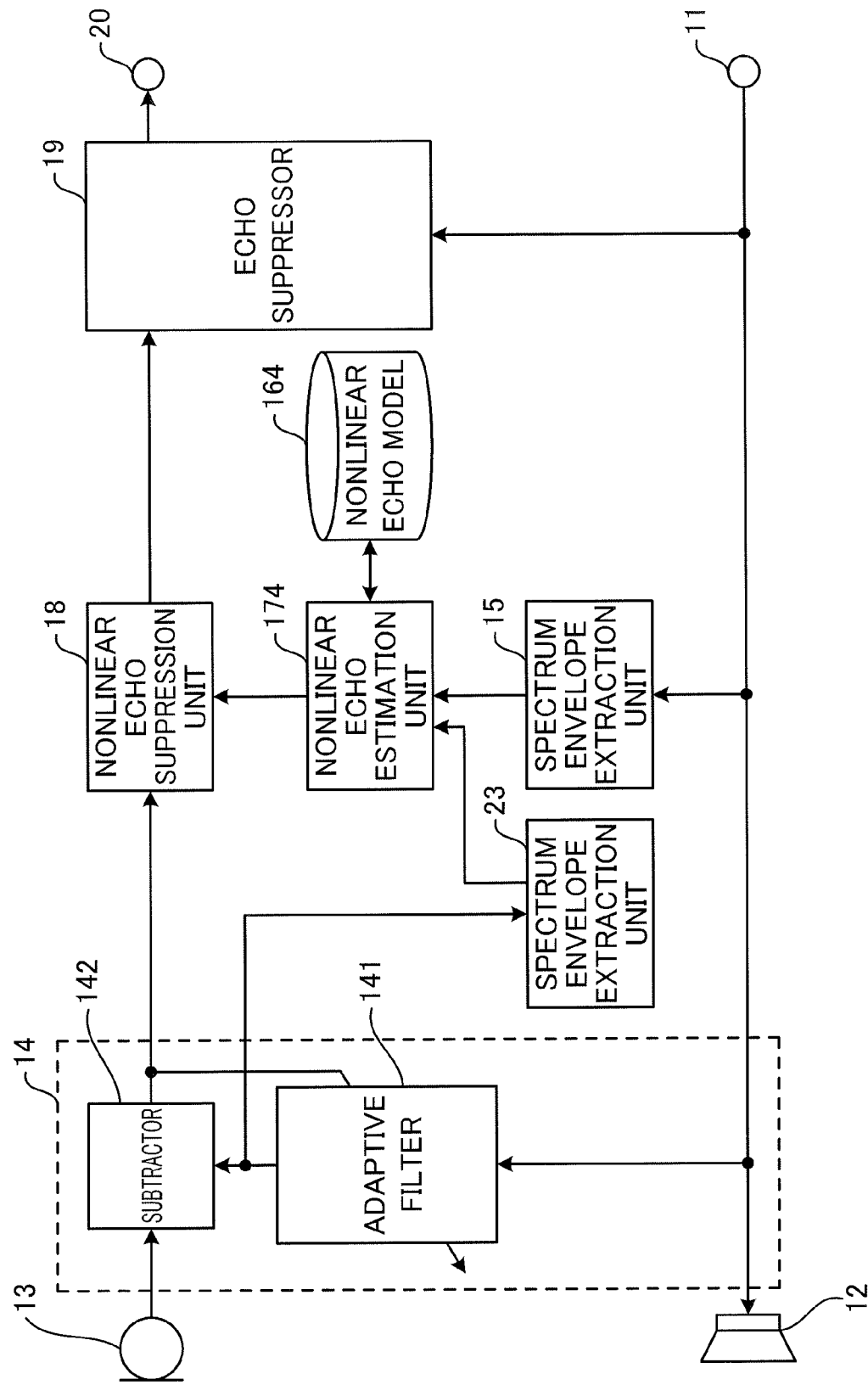
FIG. 13 is a diagram illustrating a configuration of a call device in a fifth embodiment of the present disclosure.

FIG. 13 is a diagram illustrating a configuration of a call device in the fifth embodiment of the present disclosure.

The call device illustrated in FIG. 13 includes an echo suppressing device 1D, the input terminal 11, the loudspeaker 12, the microphone 13, and the output terminal 20. In the fifth embodiment, the same components as those in the first embodiment will be denoted by the same reference signs as those in the first embodiment, and description thereof will be omitted.

The echo suppressing device 1D includes the echo canceller 14, spectrum envelope extraction units 15 and 23, a nonlinear echo model storage unit 164, a nonlinear echo estimation unit 174, the nonlinear echo suppression unit 18, and the echo suppressor 19.

The echo canceller 14 includes an adaptive filter 141 and a subtractor 142. The adaptive filter 141 convolutes a filter coefficient and a reception signal to generate a pseudo linear echo signal indicating a component of the reception signal included in an input signal. The subtractor 142 subtracts the pseudo linear echo signal from the input signal.

The spectrum envelope extraction unit 23 extracts spectrum envelope information from the pseudo linear echo signal from the adaptive filter 141. The spectrum envelope extraction unit 23 outputs the spectrum envelope information extracted from the pseudo linear echo signal to the nonlinear echo estimation unit 174.

The nonlinear echo model storage unit 164 stores in advance a nonlinear echo model indicating a relationship between spectrum envelope information extracted from a reception signal to be output to the loudspeaker 12 and the spectrum envelope information extracted from the pseudo linear echo signal from the adaptive filter of the echo canceller, and spectrum envelope information of a nonlinear echo signal. The nonlinear echo model is, for example, a neural network.

The nonlinear echo model in the fifth embodiment is learned by using, as the teacher data, the spectrum envelope information extracted from the reception signal, the spectrum envelope information extracted from the pseudo linear echo signal from the adaptive filter of the echo canceller that suppresses a linear echo signal from the input signal, and the spectrum envelope information extracted from an output signal of the echo canceller, using, as an input, the spectrum envelope information extracted from the reception signal and the spectrum envelope information extracted from the pseudo linear echo signal, and using spectrum envelope information of the nonlinear echo signal as an output.

In a learning method of the nonlinear echo model in the fifth embodiment, the spectrum envelope information extracted from the reception signal and the spectrum envelope information extracted from the pseudo linear echo signal from the adaptive filter of the echo canceller 34 are input to the nonlinear echo model learning unit 37 illustrated in FIG. 7. Then, the nonlinear echo model learning unit 37 in the fifth embodiment uses, as the teacher data, the spectrum envelope information extracted from the reception signal, the spectrum envelope information extracted from the pseudo linear echo signal of the adaptive filter of the echo canceller 34, and the spectrum envelope information extracted from the output signal of the echo canceller 34. The nonlinear echo model learning unit 37 learns the nonlinear echo model so as to output the spectrum envelope information of the nonlinear echo signal extracted from the output signal of the echo canceller 34 when the spectrum envelope information extracted from the reception signal and the spectrum envelope information extracted from the pseudo linear echo signal are input.

Using the nonlinear echo model indicating the relationship between the spectrum envelope information extracted from the reception signal and the spectrum envelope information extracted from the pseudo linear echo signal from the adaptive filter, and the spectrum envelope information of the nonlinear echo signal, the nonlinear echo estimation unit 174 estimates spectrum envelope information of the nonlinear echo signal included in the input signal from the spectrum envelope information extracted from the reception signal and the spectrum envelope information extracted from the pseudo linear echo signal from the adaptive filter 141.

The nonlinear echo estimation unit 174 reads the nonlinear echo model from the nonlinear echo model storage unit 164. The nonlinear echo estimation unit 174 acquires the spectrum envelope information of the nonlinear echo signal from the nonlinear echo model by inputting, to the nonlinear echo model, the spectrum envelope information extracted from the reception signal output from the spectrum envelope extraction unit 15 and the spectrum envelope information extracted from the pseudo linear echo signal output from the spectrum envelope extraction unit 23. The nonlinear echo estimation unit 174 outputs, to the nonlinear echo suppression unit 18, the spectrum envelope information of the nonlinear echo signal estimated using the spectrum envelope information extracted from the reception signal and the spectrum envelope information extracted from the pseudo linear echo signal.

Note that operation of the echo suppressing device 1D in the fifth embodiment is different in the processing of Steps S2 and S3 illustrated in FIG. 6. Specifically, in the fifth embodiment, in Step S2, the spectrum envelope extraction unit 15 extracts the spectrum envelope information from the reception signal to be output to the loudspeaker 12, and the spectrum envelope extraction unit 23 extracts the spectrum envelope information from the pseudo linear echo signal output from the adaptive filter of the echo canceller 14. Then, in Step S3, using the nonlinear echo model indicating the relationship between the spectrum envelope information extracted from the reception signal and the spectrum envelope information extracted from the pseudo linear echo signal from the adaptive filter of the echo canceller 14, and the spectrum envelope information of the nonlinear echo signal, the nonlinear echo estimation unit 174 estimates spectrum envelope information of the nonlinear echo signal from the spectrum envelope information extracted from the reception signal and the spectrum envelope information extracted from the pseudo linear echo signal from the adaptive filter 141 of the echo canceller 14.

In the fifth embodiment, since two signals (the spectrum envelope information of the reception signal and the spectrum envelope information of the pseudo linear echo signal) are input to the nonlinear echo model, the estimation accuracy of a nonlinear echo signal can be further improved.

Sixth Embodiment

The nonlinear echo estimation unit 17 in the first embodiment estimates spectrum envelope information of the nonlinear echo signal included in the input signal from the spectrum envelope information extracted from the reception signal using the nonlinear echo model indicating the relationship between the spectrum envelope information extracted from the reception signal and the spectrum envelope information of the nonlinear echo signal. By contrast, using a nonlinear echo model indicating a relationship between spectrum envelope information extracted from an input signal and spectrum envelope information of a nonlinear echo signal, a nonlinear echo estimation unit in a sixth embodiment estimates spectrum envelope information of a nonlinear echo signal included in the input signal from the spectrum envelope information extracted from the input signal.

Figure 14:
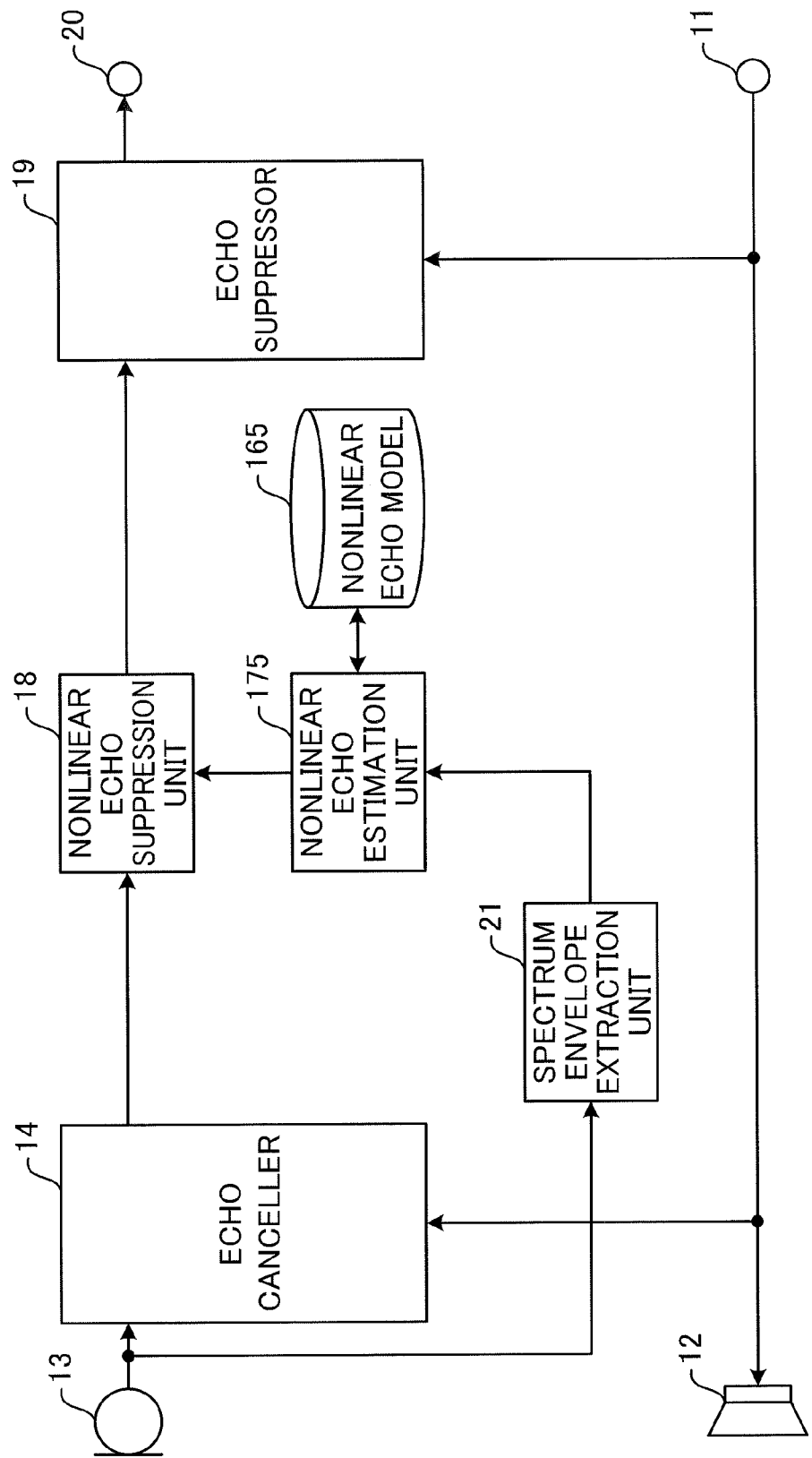
FIG. 14 is a diagram illustrating a configuration of a call device in a sixth embodiment of the present disclosure.

FIG. 14 is a diagram illustrating a configuration of a call device in the sixth embodiment of the present disclosure.

The call device illustrated in FIG. 14 includes an echo suppressing device 1E, the input terminal 11, the loudspeaker 12, the microphone 13, and the output terminal 20. In the sixth embodiment, the same components as those in the first and second embodiments will be denoted by the same reference signs as those in the first and second embodiments, and description thereof will be omitted.

The echo suppressing device 1E includes the echo canceller 14, the spectrum envelope extraction unit 21, a nonlinear echo model storage unit 165, a nonlinear echo estimation unit 175, the nonlinear echo suppression unit 18, and the echo suppressor 19.

Note that the nonlinear echo model storage unit 165 in the sixth embodiment stores in advance a nonlinear echo model indicating a relationship between spectrum envelope information extracted from an input signal acquired by the microphone 13 and spectrum envelope information of a nonlinear echo signal. The nonlinear echo model is, for example, a neural network.

The nonlinear echo model in the sixth embodiment is learned by using, as the teacher data, the spectrum envelope information extracted from the input signal and spectrum envelope information extracted from an output signal of an echo canceller that suppresses a linear echo signal from the input signal, using, as an input, the spectrum envelope information extracted from the input signal, and using the spectrum envelope information of the nonlinear echo signal as an output.

In a learning method of the nonlinear echo model in the sixth embodiment, the spectrum envelope information extracted from the input signal is input to the nonlinear echo model learning unit 37 illustrated in FIG. 7. Then, the nonlinear echo model learning unit 37 in the sixth embodiment uses, as the teacher data, the spectrum envelope information extracted from the input signal and the spectrum envelope information extracted from the output signal of the echo canceller 34 that suppresses the linear echo signal from the input signal. The nonlinear echo model learning unit 37 learns the nonlinear echo model so as to output the spectrum envelope information of the nonlinear echo signal extracted from the output signal of the echo canceller 34 when the spectrum envelope information extracted from the input signal is input.

Using the nonlinear echo model indicating the relationship between the spectrum envelope information extracted from the input signal and the spectrum envelope information of the nonlinear echo signal, the nonlinear echo estimation unit 175 estimates spectrum envelope information of the nonlinear echo signal included in the input signal from the spectrum envelope information extracted from the input signal.

The nonlinear echo estimation unit 175 reads the nonlinear echo model from the nonlinear echo model storage unit 165. The nonlinear echo estimation unit 175 acquires the spectrum envelope information of the nonlinear echo signal from the nonlinear echo model by inputting, to the nonlinear echo model, the spectrum envelope information extracted from the input signal output from the spectrum envelope extraction unit 21. The nonlinear echo estimation unit 175 outputs, to the nonlinear echo suppression unit 18, the spectrum envelope information of the nonlinear echo signal estimated using the spectrum envelope information extracted from the input signal.

Note that operation of the echo suppressing device 1E in the sixth embodiment is different in the processing of Steps S2 and S3 illustrated in FIG. 6. Specifically, in the sixth embodiment, the spectrum envelope extraction unit 21 extracts the spectrum envelope information from the input signal acquired by the microphone 13 in Step S2. Using the nonlinear echo model indicating the relationship between the spectrum envelope information extracted from the input signal and the spectrum envelope information of the nonlinear echo signal, the nonlinear echo estimation unit 175 estimates spectrum envelope information of the nonlinear echo signal from the spectrum envelope information extracted from the input signal in Step S3.

In the sixth embodiment, spectrum envelope information of the nonlinear echo signal can be estimated even from only the spectrum envelope information extracted from the input signal acquired by the microphone 13.

Seventh Embodiment

The nonlinear echo estimation unit 17 in the first embodiment estimates spectrum envelope information of the nonlinear echo signal included in the input signal from the spectrum envelope information extracted from the reception signal using the nonlinear echo model indicating the relationship between the spectrum envelope information extracted from the reception signal and the spectrum envelope information of the nonlinear echo signal. By contrast, using a nonlinear echo model indicating a relationship between spectrum envelope information extracted from an output signal of an echo canceller and spectrum envelope information of a nonlinear echo signal, a nonlinear echo estimation unit in a seventh embodiment estimates spectrum envelope information of a nonlinear echo signal included in an input signal from the spectrum envelope information extracted from the output signal of the echo canceller 14.

Figure 15:
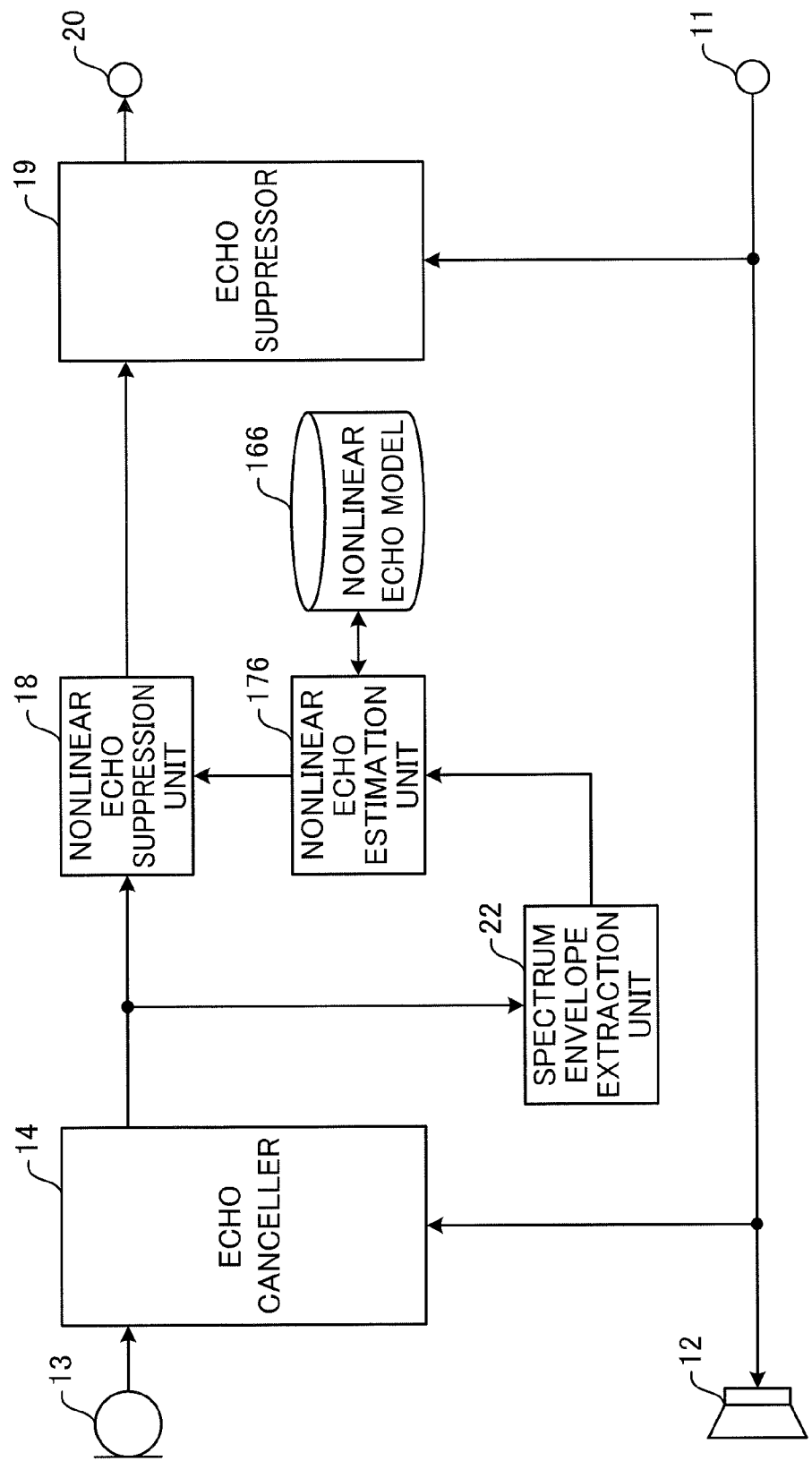
FIG. 15 is a diagram illustrating a configuration of a call device in a seventh embodiment of the present disclosure.

FIG. 15 is a diagram illustrating a configuration of a call device in the seventh embodiment of the present disclosure.

The call device illustrated in FIG. 15 includes an echo suppressing device 1F, the input terminal 11, the loudspeaker 12, the microphone 13, and the output terminal 20. In the seventh embodiment, the same components as those in the first and third embodiments will be denoted by the same reference signs as those in the first and third embodiments, and description thereof will be omitted.

The echo suppressing device 1F includes the echo canceller 14, the spectrum envelope extraction unit 22, a nonlinear echo model storage unit 166, a nonlinear echo estimation unit 176, the nonlinear echo suppression unit 18, and the echo suppressor 19.

The nonlinear echo model storage unit 166 stores in advance a nonlinear echo model indicating a relationship between spectrum envelope information extracted from an output signal of the echo canceller and spectrum envelope information of a nonlinear echo signal. The nonlinear echo model is, for example, a neural network.

The nonlinear echo model in the seventh embodiment is learned by using, as the teacher data, the spectrum envelope information extracted from the output signal of the echo canceller that suppresses the linear echo signal from the input signal and the spectrum envelope information extracted from the output signal of the echo canceller, using, as an input, the spectrum envelope information extracted from the output signal of the echo canceller, and using the spectrum envelope information of the nonlinear echo signal as an output.

In a learning method of the nonlinear echo model in the seventh embodiment, the spectrum envelope information extracted from the output signal of the echo canceller 34 is input to the nonlinear echo model learning unit 37 illustrated in FIG. 7. Then, the nonlinear echo model learning unit 37 in the seventh embodiment uses, as the teacher data, the spectrum envelope information extracted from the output signal of the echo canceller 34 that suppresses the linear echo signal from the input signal, and the spectrum envelope information extracted from the output signal of the echo canceller 34. The nonlinear echo model learning unit 37 learns the nonlinear echo model so as to output the spectrum envelope information of the nonlinear echo signal extracted from the output signal of the echo canceller 34 when the spectrum envelope information extracted from the output signal of the echo canceller 34 is input.

Using the nonlinear echo model indicating the relationship between the spectrum envelope information extracted from the output signal of the echo canceller and the spectrum envelope information of the nonlinear echo signal, the nonlinear echo estimation unit 176 estimates spectrum envelope information of the nonlinear echo signal included in the input signal from the spectrum envelope information extracted from the output signal of the echo canceller 14.

The nonlinear echo estimation unit 176 reads the nonlinear echo model from the nonlinear echo model storage unit 166. The nonlinear echo estimation unit 176 acquires the spectrum envelope information of the nonlinear echo signal from the nonlinear echo model by inputting, to the nonlinear echo model, the spectrum envelope information extracted from the output signal of the echo canceller 14, the output signal being output from the spectrum envelope extraction unit 22. The nonlinear echo estimation unit 176 outputs, to the nonlinear echo suppression unit 18, the spectrum envelope information of the nonlinear echo signal estimated using the spectrum envelope information extracted from the output signal of the echo canceller 14.

Note that operation of the echo suppressing device 1F in the seventh embodiment is different in the processing of Steps S2 and S3 illustrated in FIG. 6. In the seventh embodiment, the spectrum envelope extraction unit 22 extracts the spectrum envelope information from the output signal of the echo canceller 14 in Step S2. Then, in Step S3, using the nonlinear echo model indicating the relationship between the spectrum envelope information extracted from the output signal of the echo canceller 14 and the spectrum envelope information of the nonlinear echo signal, the nonlinear echo estimation unit 176 estimates spectrum envelope information of the nonlinear echo signal from the spectrum envelope information extracted from the output signal of the echo canceller 14.

In the seventh embodiment, spectrum envelope information of the nonlinear echo signal can be estimated even from only the spectrum envelope information extracted from the output signal of the echo canceller 14.

Eighth Embodiment

The echo suppressing device 1 in the first embodiment includes the echo suppressor 19. By contrast, an echo suppressing device in an eighth embodiment does not include the echo suppressor 19.

Figure 16:
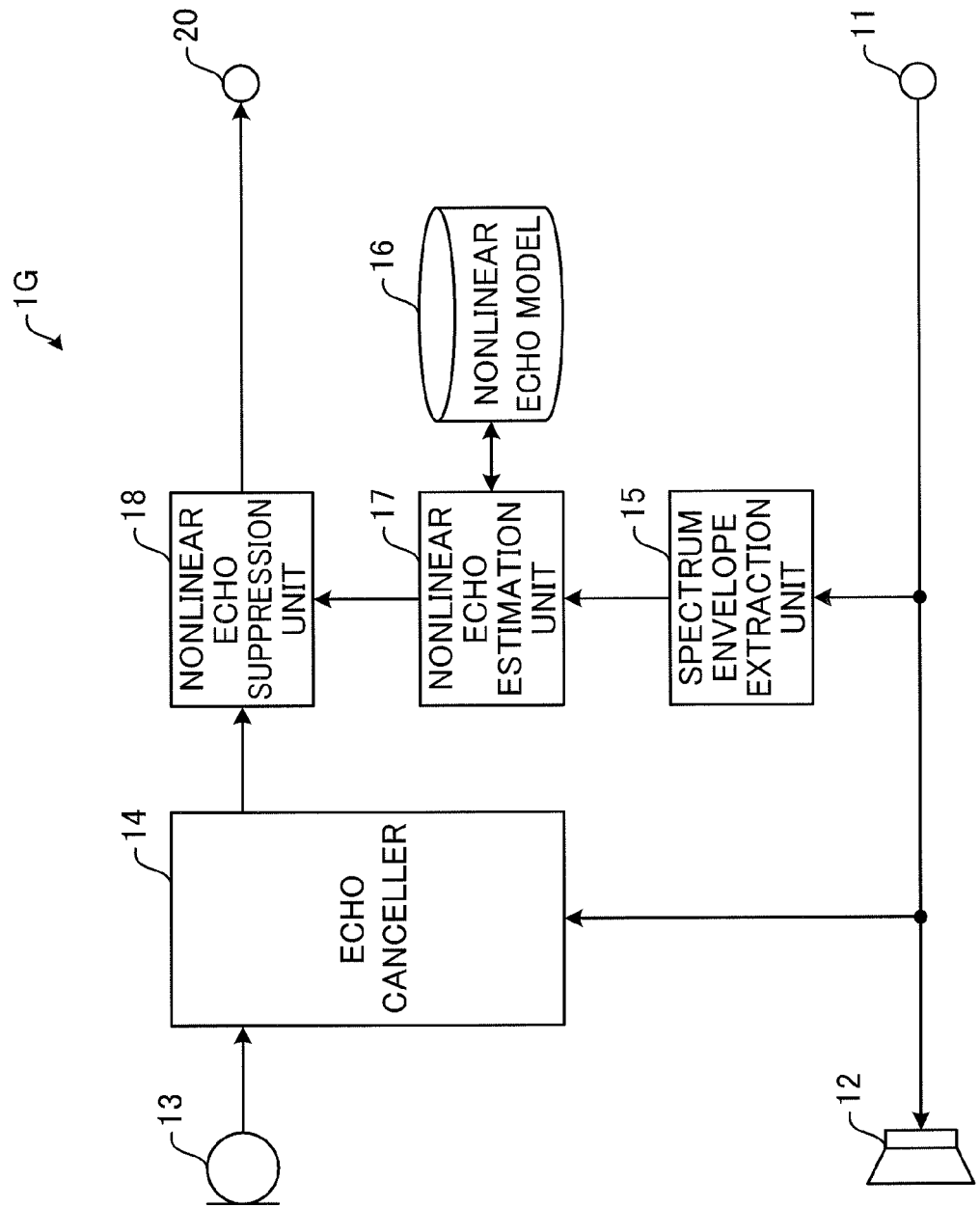
FIG. 16 is a diagram illustrating a configuration of a call device in an eighth embodiment of the present disclosure.

FIG. 16 is a diagram illustrating a configuration of a call device in the eighth embodiment of the present disclosure.

The call device illustrated in FIG. 16 includes an echo suppressing device 1G, the input terminal 11, the loudspeaker 12, the microphone 13, and the output terminal 20. In the eighth embodiment, the same components as those in the first embodiment will be denoted by the same reference signs as those in the first embodiment, and description thereof will be omitted.

The echo suppressing device 1G includes the echo canceller 14, the spectrum envelope extraction unit 15, the nonlinear echo model storage unit 16, the nonlinear echo estimation unit 17, and the nonlinear echo suppression unit 18.

The echo suppressing device 1G of the eighth embodiment is different from the echo suppressing device 1 of the first embodiment in that the echo suppressor 19 is not provided.

The nonlinear echo suppression unit 18 outputs an input signal with only a nonlinear echo signal suppressed to the output terminal 20.

FIG. 17 is a flowchart for explaining operation of the echo suppressing device 1G in the eighth embodiment of the present disclosure.

Processing in Steps S11 to S14 is the same as the processing in Steps S1 to S4 illustrated in FIG. 6, and thus description thereof will be omitted.

Note that each of the echo suppressing devices of the second to the seventh embodiments may not include the echo suppressor 19 as in the eighth embodiment.

In each of the above embodiments, each constituent element may be implemented by being configured with dedicated hardware or by execution of a software program suitable for each constituent element. Each constituent element may be implemented by reading and execution, by a program execution unit such as a CPU or a processor, of a software program recorded in a recording medium such as a hard disk or a semiconductor memory. In addition, the program may be recorded in a recording medium and transferred, or the program may be transferred via a network to carry out the program by another independent computer system.

Some or all of the functions of the devices according to the embodiments of the present disclosure are implemented as large scale integration (LSI), which is typically an integrated circuit. These may be individually integrated into one chip, or may be integrated into one chip so as to include some or all of them. In addition, the circuit integration is not limited to LSI, and may be implemented by a dedicated circuit or a general-purpose processor. A field programmable gate array (FPGA), which can be programmed after manufacturing of LSI, or a reconfigurable processor in which connections and setting of circuit cells inside LSI can be reconfigured may be used.

Some or all of the functions of the devices according to the embodiments of the present disclosure may be implemented by a processor such as a CPU executing a program.

The numbers used above are all illustrated to specifically describe the present disclosure, and the present disclosure is not limited to the illustrated numbers.

The order in which each step illustrated in the above flowcharts is executed is for specifically describing the present disclosure, and may be any order other than the above order as long as a similar effect is obtained. Some of the above steps may be executed simultaneously (in parallel) with other steps.

INDUSTRIAL APPLICABILITY

Since the technique according to the present disclosure enables stable suppression of a nonlinear echo signal included in an input signal acquired by a microphone, the technique is useful as a technique for suppressing a linear echo signal and a nonlinear echo signal included in the input signal acquired by the microphone.

The invention claimed is:
1. An echo suppressing device comprising:
a first linear echo suppression unit that estimates an amplitude component and a phase component of a linear echo signal included in an input signal acquired by a microphone to suppress the linear echo signal from the input signal;
a spectrum envelope extraction unit that extracts spectrum envelope information from at least one of a reception signal to be output to a loudspeaker, the input signal, and an output signal of the first linear echo suppression unit;
a nonlinear echo estimation unit that estimates spectrum envelope information of a nonlinear echo signal included in the input signal from at least one of spectrum envelope information extracted from the reception signal, spectrum envelope information extracted from the input signal, and spectrum envelope information extracted from the output signal of the first linear echo suppression unit; and
a nonlinear echo suppression unit that suppresses the nonlinear echo signal from the output signal of the first linear echo suppression unit by using the spectrum envelope information of the nonlinear echo signal estimated by the nonlinear echo estimation unit.

2. The echo suppressing device according to claim 1, further comprising:
a second linear echo suppression unit that estimates an amplitude component of a residual linear echo signal that has not been suppressed by the first linear echo suppression unit to suppress the residual linear echo signal from the output signal of the nonlinear echo suppression unit.

3. The echo suppressing device according to claim 1, wherein
using a nonlinear echo model indicating a relationship between at least one of the spectrum envelope information extracted from the reception signal, the spectrum envelope information extracted from the input signal, and the spectrum envelope information extracted from the output signal of the first linear echo suppression unit, and the spectrum envelope information of the nonlinear echo signal, the nonlinear echo estimation unit estimates spectrum envelope information of the nonlinear echo signal included in the input signal from at least one of the spectrum envelope information extracted from the reception signal, the spectrum envelope information extracted from the input signal, and the spectrum envelope information extracted from the output signal of the first linear echo suppression unit.

4. The echo suppressing device according to claim 3, wherein
the nonlinear echo model is learned by using, as teacher data, at least one of the spectrum envelope information extracted from the reception signal, the spectrum envelope information extracted from the input signal, and the spectrum envelope information extracted from the output signal of the first linear echo suppression unit, and the spectrum envelope information extracted from the output signal of the first linear echo suppression unit that suppresses the linear echo signal from the input signal, using, as an input, at least one of the spectrum envelope information extracted from the reception signal, the spectrum envelope information extracted from the input signal, and the spectrum envelope information extracted from the output signal of the first linear echo suppression unit, and using the spectrum envelope information of the nonlinear echo signal as an output.

5. The echo suppressing device according to claim 3, wherein
using the nonlinear echo model indicating a relationship between the spectrum envelope information extracted from the reception signal and the spectrum envelope information of the nonlinear echo signal, the nonlinear echo estimation unit estimates spectrum envelope information of the nonlinear echo signal included in the input signal from the spectrum envelope information extracted from the reception signal.

6. The echo suppressing device according to claim 3, wherein
using the nonlinear echo model indicating a relationship between the spectrum envelope information extracted from the reception signal and the spectrum envelope information extracted from the input signal, and the spectrum envelope information of the nonlinear echo signal, the nonlinear echo estimation unit estimates spectrum envelope information of the nonlinear echo signal included in the input signal from the spectrum envelope information extracted from the reception signal and the spectrum envelope information extracted from the input signal.

7. The echo suppressing device according to claim 3, wherein
using the nonlinear echo model indicating a relationship between the spectrum envelope information extracted from the reception signal and the spectrum envelope information extracted from the output signal of the first linear echo suppression unit, and the spectrum envelope information of the nonlinear echo signal, the nonlinear echo estimation unit estimates spectrum envelope information of the nonlinear echo signal included in the input signal from the spectrum envelope information extracted from the reception signal and the spectrum envelope information extracted from the output signal of the first linear echo suppression unit.

8. The echo suppressing device according to claim 3, wherein
using the nonlinear echo model indicating a relationship between the spectrum envelope information extracted from the reception signal, the spectrum envelope information extracted from the input signal and the spectrum envelope information extracted from the output signal of the first linear echo suppression unit, and the spectrum envelope information of the nonlinear echo signal, the nonlinear echo estimation unit estimates spectrum envelope information of the nonlinear echo signal included in the input signal from the spectrum envelope information extracted from the reception signal, the spectrum envelope information extracted from the input signal, and the spectrum envelope information extracted from the output signal of the first linear echo suppression unit.

9. The echo suppressing device according to claim 3, wherein
the first linear echo suppression unit includes an adaptive filter that generates a pseudo linear echo signal indicating a component of the reception signal included in the input signal by convoluting a filter coefficient and the reception signal, and a subtractor that subtracts the pseudo linear echo signal from the input signal, and
using the nonlinear echo model indicating a relationship between the spectrum envelope information extracted from the reception signal and spectrum envelope information extracted from the pseudo linear echo signal from the adaptive filter, and the spectrum envelope information of the nonlinear echo signal, the nonlinear echo estimation unit estimates spectrum envelope information of the nonlinear echo signal included in the input signal from the spectrum envelope information extracted from the reception signal and the spectrum envelope information extracted from the pseudo linear echo signal from the adaptive filter.

10. The echo suppressing device according to claim 3, wherein
using the nonlinear echo model indicating a relationship between the spectrum envelope information extracted from the input signal and the spectrum envelope information of the nonlinear echo signal, the nonlinear echo estimation unit estimates spectrum envelope information of the nonlinear echo signal included in the input signal from the spectrum envelope information extracted from the input signal.

11. The echo suppressing device according to claim 1, wherein
the spectrum envelope extraction unit extracts spectrum envelope information from at least one of the reception signal, the input signal, and the output signal of the first linear echo suppression unit by a linear predictive coding analysis method.

12. The echo suppressing device according to claim 1, wherein
the spectrum envelope extraction unit converts at least one linear predictive coding coefficient of the reception signal, the input signal, and the output signal of the first linear echo suppression unit analyzed by a linear predictive coding analysis method into a partial auto-correlation (PARCOR) coefficient, and extracts spectrum envelope information represented by the converted PARCOR coefficient.

13. An echo suppressing method comprising:
estimating, by a first linear echo suppression unit, an amplitude component and a phase component of a linear echo signal included in an input signal acquired by a microphone to suppress the linear echo signal from the input signal;
extracting, by a spectrum envelope extraction unit, spectrum envelope information from at least one of a reception signal to be output to a loudspeaker, the input signal, and an output signal of the first linear echo suppression unit;
estimating, by a nonlinear echo estimation unit, spectrum envelope information of a nonlinear echo signal included in the input signal from at least one of spectrum envelope information extracted from the reception signal, spectrum envelope information extracted from the input signal, and spectrum envelope information extracted from the output signal of the first linear echo suppression unit; and
suppressing, by a nonlinear echo suppression unit, the nonlinear echo signal from the output signal of the first linear echo suppression unit by using the spectrum envelope information of the nonlinear echo signal estimated by the nonlinear echo estimation unit.

14. A non-transitory computer readable recording medium storing an echo suppressing program causing a computer to function as:
a first linear echo suppression unit that estimates an amplitude component and a phase component of a linear echo signal included in an input signal acquired by a microphone to suppress the linear echo signal from the input signal;
a spectrum envelope extraction unit that extracts spectrum envelope information from at least one of a reception signal to be output to a loudspeaker, the input signal, and an output signal of the first linear echo suppression unit;
a nonlinear echo estimation unit that estimates spectrum envelope information of a nonlinear echo signal included in the input signal from at least one of spectrum envelope information extracted from the reception signal, spectrum envelope information extracted from the input signal, and spectrum envelope information extracted from the output signal of the first linear echo suppression unit; and a nonlinear echo suppression unit that suppresses the nonlinear echo signal from the output signal of the first linear echo suppression unit by using the spectrum envelope information of the nonlinear echo signal estimated by the nonlinear echo estimation unit.

* * * * *